United States Patent [19]

Duensing et al.

[11] Patent Number: 5,465,378
[45] Date of Patent: Nov. 7, 1995

[54] REPORT GENERATING SYSTEM

[75] Inventors: David T. Duensing, Leawood; Dayle E. Phillips, Overland Park; Dennis C. Simmons, Mission Hills, all of Kans.

[73] Assignee: Compuspeak, Inc., Kansas City, Mo.

[21] Appl. No.: 135,167

[22] Filed: Oct. 12, 1993

Related U.S. Application Data

[60] Division of Ser. No. 774,743, Oct. 11, 1991, abandoned, which is a continuation-in-part of Ser. No. 523,607, May 15, 1990, abandoned.

[51] Int. Cl.⁶ .............................. G06F 15/00; G10L 5/00
[52] U.S. Cl. .............................. 395/800; 395/2; 381/42; 381/52
[58] Field of Search ..................................... 395/650, 700, 395/800

[56] References Cited

U.S. PATENT DOCUMENTS 4,852,170 7/1989 Bordeaux .
4,873,714 10/1989 Ishii et al. .
4,972,485 11/1990 Dautrich et al. .
5,003,603 3/1991 Searcy et al. .
5,182,765 1/1993 Ishii et al. .
5,231,670 7/1993 Goldhor et al. .............................. 395/2

Primary Examiner—Kevin A. Kriess
Assistant Examiner—John Q. Chavis
Attorney, Agent, or Firm—Hovey, Williams, Timmons & Collins

[57] ABSTRACT

A preferred report generating system includes a computer (12) responsive to user-spoken inputs for selecting previously defined report material including text and graphics stored in memory respectively corresponding to the inputs, for activating other user inputs, and implementing corresponding computer commands. After receipt of preferred user-spoken inputs entered by way of a microphone (16) representing information needed for generating a report, the system compiles the report material corresponding to the user-selected inputs for generating the report.

7 Claims, 20 Drawing Sheets

REPORT GENERATING SYSTEM

This is a division of application Ser. No. 07/774,743, filed on Oct. 11, 1991 which is a FWCIP of Ser. No. 07/523,607 filed May 15, 1990, now both abandoned.

BACKGROUND OF THE INVENTION

1. Field of the Invention

The present invention concerns a report generating system which responds to selected user inputs for retrieving corresponding, previously defined report material and then compiles the retrieved material to form the report after receipt of user inputs representing needed information.

2. Description of the Prior Art

Many professions require the frequent production of reports concerning various topics. Typically the reports cover a limited range of topics specific to the profession and as a result, blocks of text can be repeated in a number of different reports.

Some word processing systems, for example, allow the use of so-called "macros" which allow the user to define a relatively short word or code—representing blocks of text to be stored and then quickly recalled by executing the macro in order to save composition time. To effectively use such a system to generate a wide range of routine reports, however, a large number of macros must be defined which becomes unwieldy for the user to manage. Additionally, some professionals prefer to dictate reports which precludes the use of typed macros in a word processing system. Further, once a macro is executed, it is not possible to delete the effect of a macro in the event of an error.

Also, it is often necessary to gather data in environments in which the use of a computer with a conventional screen is not practical. For example, when an estimate of the damage to a car is made or inventory taken in a warehouse, a data entry person is usually in a place where a computer screen is impractical. In these situations it has been common for a clerk to write down the data on a sheet of paper which in turn is then entered into a computer at a later time. Another way of entering information has included bar code entry, where a user uses a laser scanner to enter information via a bar code system.

The above mentioned procedures, however, suffer from slow speed and the inability to retrieve relevant pieces of information while at the data gathering location. Also, with regard to bar code entry it is difficult to confirm if data was wrongly entered or if duplicative entries have been made. Therefore, it is very difficult to correct any errors, at the data gathering site, which may be made.

SUMMARY OF THE INVENTION

The prior art problems discussed above are solved by the report generating system of the present invention and the state of the art enhanced thereby. More particularly, the system hereof allows the rapid and convenient generation of reports without the need for managing and keeping track of a large number of word processing commands.

Broadly speaking, the preferred embodiment of the invention uses a computer for generating a report in which data is stored in the computer data memory representative of predefined sets of user inputs representing information needed for generating the report, and data representative of computer actions respectively corresponding to the inputs. These actions may include, for example, retrieving report material such as text and graphics, presenting another set of allowable user inputs, and implementing computer commands.

A first set of user inputs is initially presented to the user whereupon the user selects one of the inputs. In response the computer executes the actions corresponding to the user-selected input which may include the retrieval of corresponding report material, execution of certain computer commands, and the presentation of another set of user inputs for selection. These steps are repeated until the required user inputs have been entered for generating the particular report. The computer then compiles the retrieved report material to form the report.

In preferred forms, only the set of user inputs being presented to the user are active. That is to say, the computer will only respond to those user inputs being presented to the user at that time. Other preferred aspects of the present invention are described further hereinbelow. Additionally, in the event the user selected an input in error, the effects of that input can be effectively reversed so that the operation reverts to a previous state set of user selectable inputs.

In the preferred form of the invention for generating a report without the aid of a computer screen, the problems outlined above are solved by a system of speech interactive report generation. That is to say, the system hereof allows a user to enter data using speech recognition technology which is much faster than the approaches discussed above and is also more intuitive thereby minimizing the amount of training time necessary to learn the system.

If no computer screen is available, the user can easily become distracted and forget where in the process of data entry he is. Speech synthesis is used to inform the user as to his place in the process. The system hereof also allows the user to enter data without the aid of a computer screen yet still confirms to the user what data has been entered. Also, the user may retrieve data which has been previously entered, and edit previously entered data. In the preferred system the possible voice commands to which the system will respond are limited by activating a set of commands which are only applicable for the current type of data gathering. In addition, duplicative entries are eliminated by allowing the entry of a given item only once. The system hereof has the further advantage of allowing the user to use the system in a hands free mode through the use of an RF transceiver headset and base station connected to the system.

BRIEF DESCRIPTION OF THE DRAWINGS

FIG. 18 is a block diagram of the system configuration for the speech interactive embodiment of the present invention;

FIG. 19A is a portion of a computer program flowchart of the application start-up of the speech interactive embodiment of the present invention;

FIG. 19B is another portion of a computer program flowchart for the application start-up of the speech interactive embodiment of the present invention;

FIG. 20 is an overview computer program flowchart of the speech interactive embodiment of the present invention;

FIG. 21 is a portion of a computer program flowchart for creating an estimate in accordance with the speech interactive embodiment of the present invention;

FIG. 22A is a portion of a computer program flowchart for entering administrative data in accordance with the speech interactive embodiment of the present invention;

FIG. 22B is another portion of, a computer program flowchart for entering administrative data in accordance with the speech interactive embodiment of the present invention;

FIG. 23A is a portion of a computer program flowchart for entering vehicle options in accordance with the speech interactive embodiment of the present invention;

FIG. 23B is another portion of a computer program flowchart for entering vehicle options in accordance with the speech interactive embodiment of the present invention;

FIG. 24A is a portion of a computer program flowchart for entering repair data in accordance with the speech interactive embodiment of the present invention;

FIG. 24B is another portion of a computer program flowchart for entering repair data in accordance with the speech interactive embodiment of the present invention;

FIG. 24C is another portion of a computer program flowchart for entering repair data in accordance with the preferred embodiment of the present invention;

FIG. 24D is another portion of a computer program flowchart for entering repair data in accordance with the speech interactive embodiment of the present invention;

FIG. 25A is a portion of a computer program flowchart for entering rate overrides in accordance with the speech interactive embodiment of the present invention;

FIG. 25B is another portion of a computer program flowchart for entering rate overrides in accordance with the speech interactive embodiment of the present invention;

FIG. 26A is a portion of a computer program flowchart for entering explanations in accordance with the speech interactive embodiment of the present invention;

FIG. 26B is another portion of a computer program flowchart for entering explanations in accordance with the speech interactive embodiment of the present invention;

FIG. 27A is a portion of a computer program flowchart for calculating the estimate in accordance with the speech interactive embodiment of the present invention; and FIG. 27B is another portion of a computer program flowchart for calculating the estimate in accordance with the speech interactive embodiment of the present invention.

DESCRIPTION OF THE PREFERRED EMBODIMENT

Figure 1:
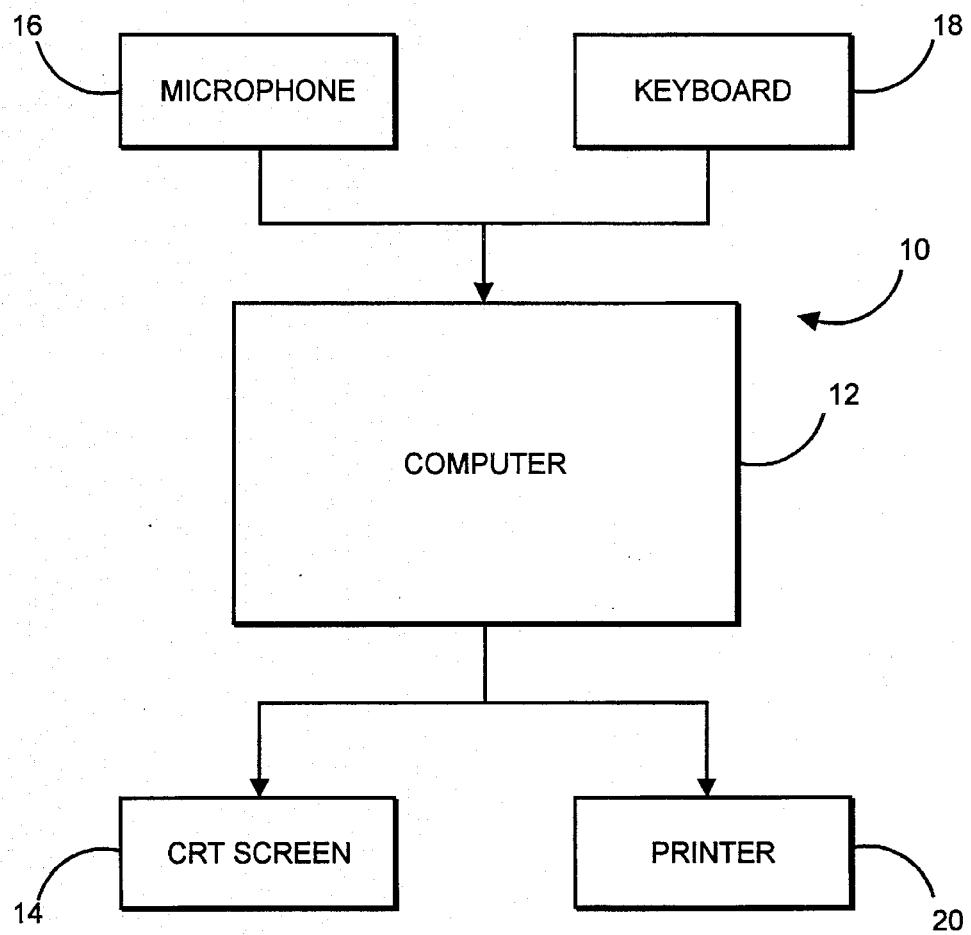
FIG. 1 is a block diagram illustrating the components of the preferred apparatus of the present invention.

FIG. 1 illustrates preferred report-generating apparatus 10 which includes computer 12, output VGA, CRT screen 14, speech input microphone 16, data input keyboard 18 and output printer 20. Computer 12 is preferably a DOS-based personal computer such as an IBM personal computer having a type 80386 central processing unit operating at 20 MHz. including four megabytes of central memory. Computer 12 also includes a VGA card for driving screen 14, a TARGA 16 image capture board available from Truevision, Inc., a floppy disk drive, a 40 MB hard drive, an I/O card with parallel and serial ports, and a CompuSpeak Laboratories speech board for receiving inputs from microphone 16.

Printer 20 is preferably a laser printer capable of producing quality graphics.

FIGS. 2–17 are computer program flowcharts illustrating the preferred program for operating computer 12 and thereby apparatus 10 and further illustrating the preferred method of the present invention. The program hereof is preferably developed using Microsoft Assembler version 5.0 by Microsoft Corporation, Turbo C Compiler version 2.0 by Borland International, Text Editor version 0.05 by Brightbill-Roberts and Company, and Speech Driver Interface by Dragon Systems for addressing the speech board of computer 12.

By way of overview, the process of generating a user-specific report concerning a particular topical area is called a "script." The script for a particular user and topical area includes specific report material such as text, images and graphics stored in the computer memory. The script is a text file consisting of high level commands developed in cooperation with the script designer and the user and presents the data and the order of data presentation for generating the report. During the process of generating a report, the user is presenting with certain allowable and selectable inputs on screen 14 in a format such as that illustrated in FIG. 16.

In the preferred embodiment, the user speaks one of the allowable inputs which, when that input is recognized, the computer responds by selecting corresponding report material for use in compiling the report. Additionally, the computer may also respond by implementing other computer commands such as storing the user's input selection in memory for later use in preparing summary reports, and may respond by deleting the previous set of allowable inputs from screen 14 and replacing them with a new set of allowable inputs. That is to say, if the user selected and enters a particular input in error, this input and all associated actions can be deleted and the script restored to the previous state to again display the previous set of selectable inputs.

The user is led efficiently step-by-step through the script in a top-down logical progression through the report and, in this way, a report is generated which is complete in all required aspects. That is to say, the script requires the user to provide all necessary inputs and thereby prevents portions being inadvertently omitted or forgotten.

Figure 2:
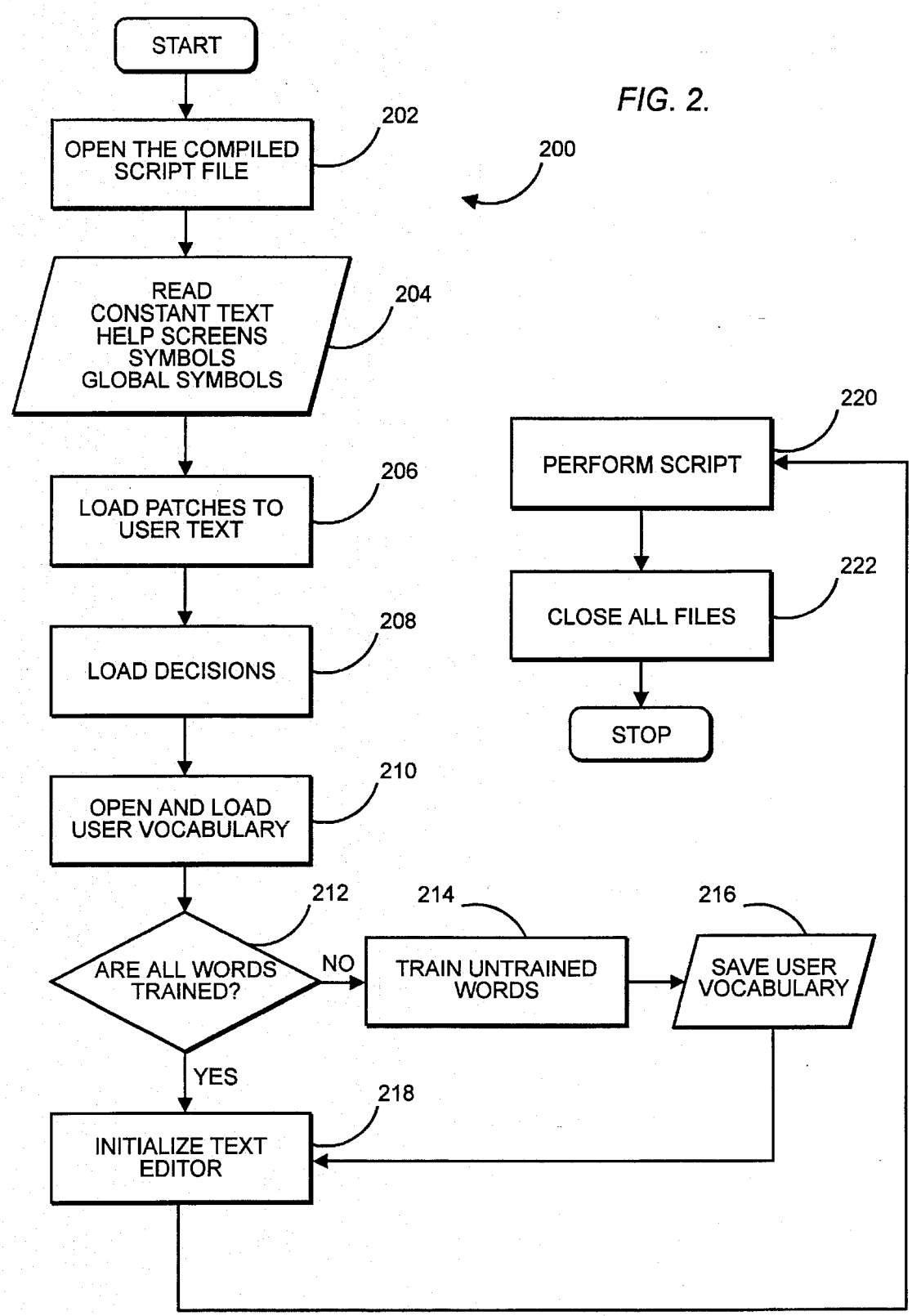
FIG. 2 is a computer program flowchart of the SCRIPT PROCESSOR routine included in the apparatus of FIG. 1 for operation thereof.

FIG. 2 illustrates SCRIPT PROCESSOR routine 200 which is the routine for processing all scripts. Routine 200 enters at step 202 which opens, that is, accesses the previously compiled script stored in memory. In order to facilitate the construction and improve the efficiency of the SCRIPT PROCESSOR the source code for the script is compiled. The source code compiler checks the syntax of the high level commands, codifies the script commands in the proper format, produces a data file containing the codified commands, produces a separate data file which is the script and which also includes the voice-recognition templates for the voice inputs used in the script, and finally invokes the voice recognition compiler. With this organization of the script, the data is organized so that program execution speed is greatly enhanced.

The program next moves to step 204 which retrieves the screen layouts for display on screen 14 at the appropriate times defined by the script.

In step 206 the program retrieves from memory the so-called "patches" which are the user-specific report material and inputs. In other words, each end user develops his or her own set of data which can be incorporated into that user's report. The program then moves to step 208 which retrieves the sets of user inputs, also called "decisions." That is to say, each time the user is presenting with a set of inputs, the user is prompted to make a decision concerning which input is desired.

The program then moves to step 210 which loads the particular user's voice template from the hard disk of computer 12 to the central memory. The data retrieved from the hard drive in steps 204–210 are loaded to central memory of the computer for enhanced operating speed.

In step 212, the program asks whether all of the vocabulary words entered in step 210 have a corresponding voice template, that is, whether the user has "trained" the computer to recognize his or her voice pattern for each of these vocabulary words. If no, step 214 prompts the user to speak the "untrained" words and then in step 216 stores them in the user's vocabulary. As will be appreciated, the use of voice recognition templates provides inherent security against unauthorized use of apparatus 10, and further allows scripts of numerous users to be resident in the computer without risk of any confusion.

If the answer in step 212 is yes, or after step 216, the program moves to step 218 in which a temporary text editor file is initialized which is a "scratch pad" for temporary storage of text extracts. This is to be distinguished from the "normal" text editor which is the report material presented on the screen. In this regard, the program sets up a temporary text editor not visible to the user but which is used to compile the blocks of report material retrieved in correspondence with the user inputs. This allows the user to edit the retrieved blocks of report material as desired.

The central memory is also mapped to include two data transfer areas—DTA1 and DTA2—for interim storage of data extracted during generation of report process for subsequent transfer in and out of the permanent data base, for example.

The program is now ready to execute the user-specific script illustrated in FIG. 3–15 after which step 222 closes applicable files and the execution of SCRIPT PROCESSOR routine 200 ends.

Figure 3:
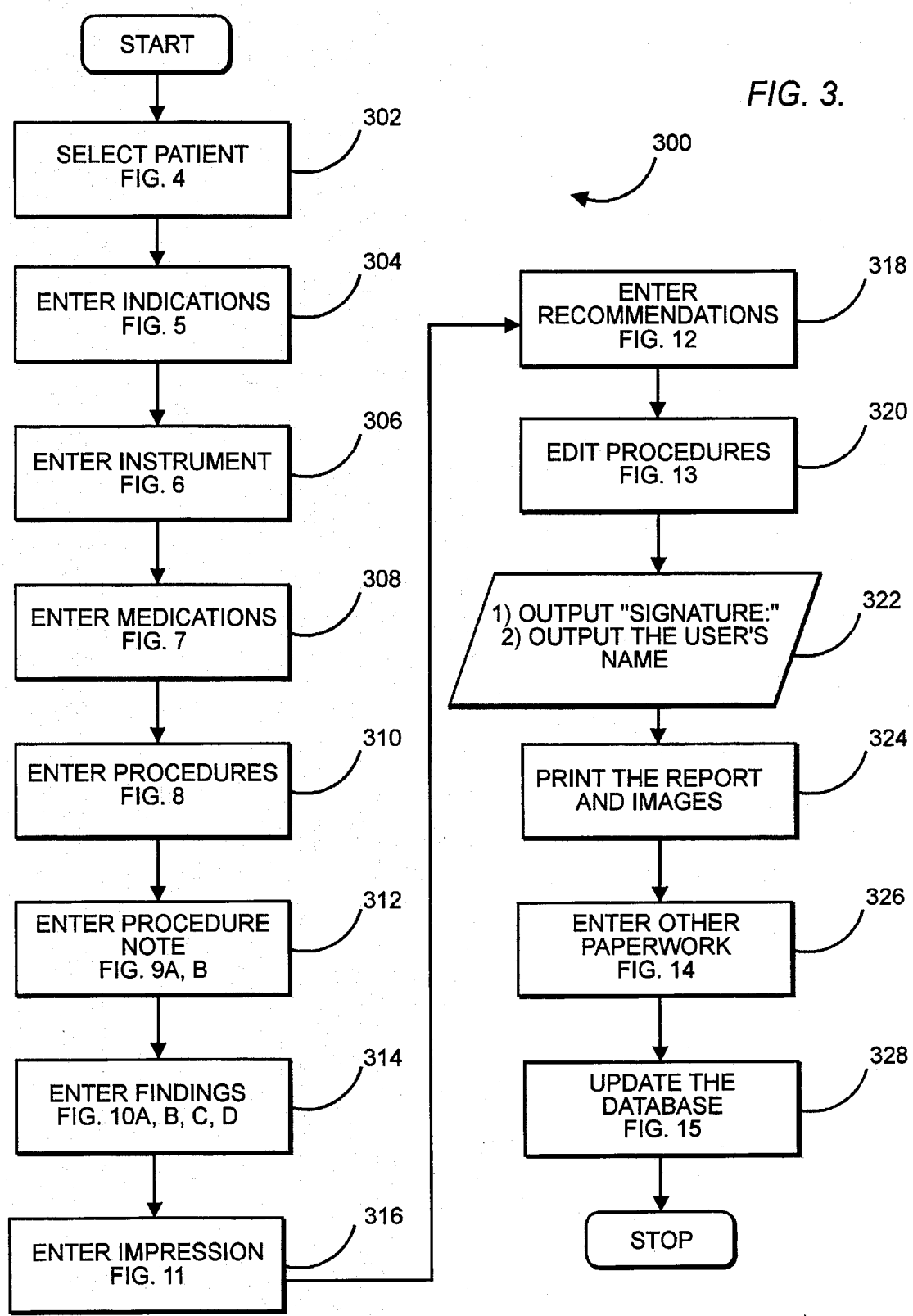
FIG. 3 is a computer program flowchart of an exemplary SCRIPT subroutine of the SCRIPT PROCESSOR routine.

FIG. 3 is an overview illustrating the major steps of SCRIPT subroutine 300 which presents an example of a script for generating a report specific to the medical procedure known as colonoscopy. Subroutine 300 enters at step 302 for taking the first action in generating a report by selecting which patient examination is to be reported. Next, the physician speaks the appropriate input to enter the medical indications which prompted the performance of the examination.

In steps 306–318 submodule 300 prompts the physician to speak the various inputs for entering the medications, procedures, procedure note, findings, impression and recommendations respectively. As can be seen, the predefined script ensures that all of the required information necessary to complete the report is entered and entered in the proper order.

In step 320, various editing procedures are implemented and, in step 322, the physician's signature block is retrieved for the report. The report and associated images are then printed on laser printer 20 in step 324 after which other paperwork is handled in step 326. Finally, a cumulative database is updated in step 328 after which the program returns to step 222 of module 200 (FIG. 2).

Figure 4:
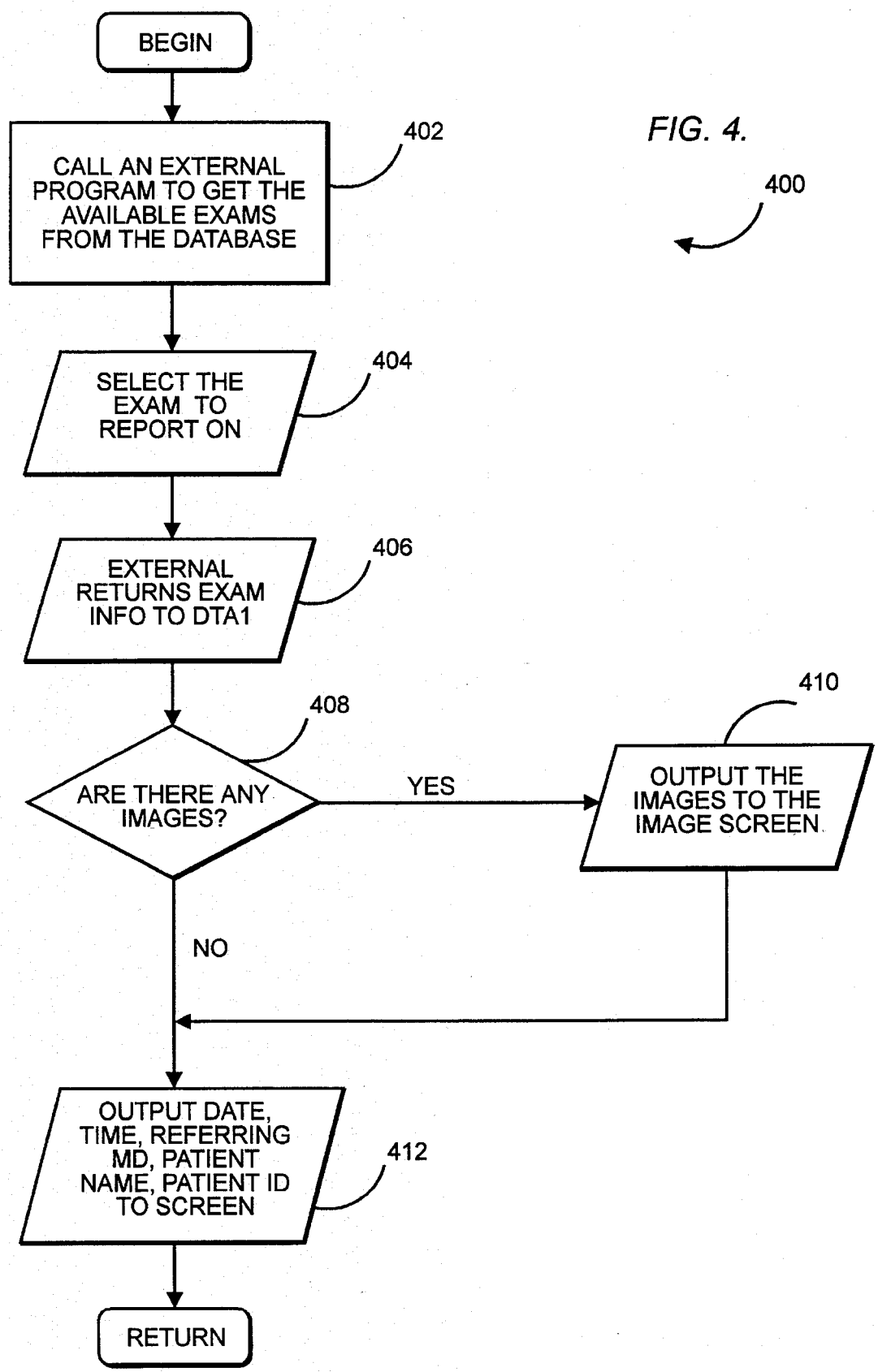
FIG. 4 is a computer program flowchart of the SELECT PATIENT module of the SCRIPT subroutine.

FIG. 4 illustrates SELECT PATIENT module 400 which enters at step 402 and retrieves appropriate data or calls an external program concerning a specific patient examination. It is conventional practice for scheduled patient examinations to be entered in the database and step 402 retrieves the information for a patient about whom the report is to generated.

In step 404 the physician is prompted to select the examination that is to be reported. In the present example, the specific examination to be reported is colonoscopy, but the script may also include other examination procedures concerning which the user-physician has expertise. This exemplary report, however, is concerned with colonoscopy concerning a specific patient.

In step 406 the fact that the physician is producing a report concerning colonoscopy is stored in a database for use in generating summary reports. Finally, in step 408, other patient-specific information is retrieved and a "header" is formed for the report using the information as shown.

Figure 5:
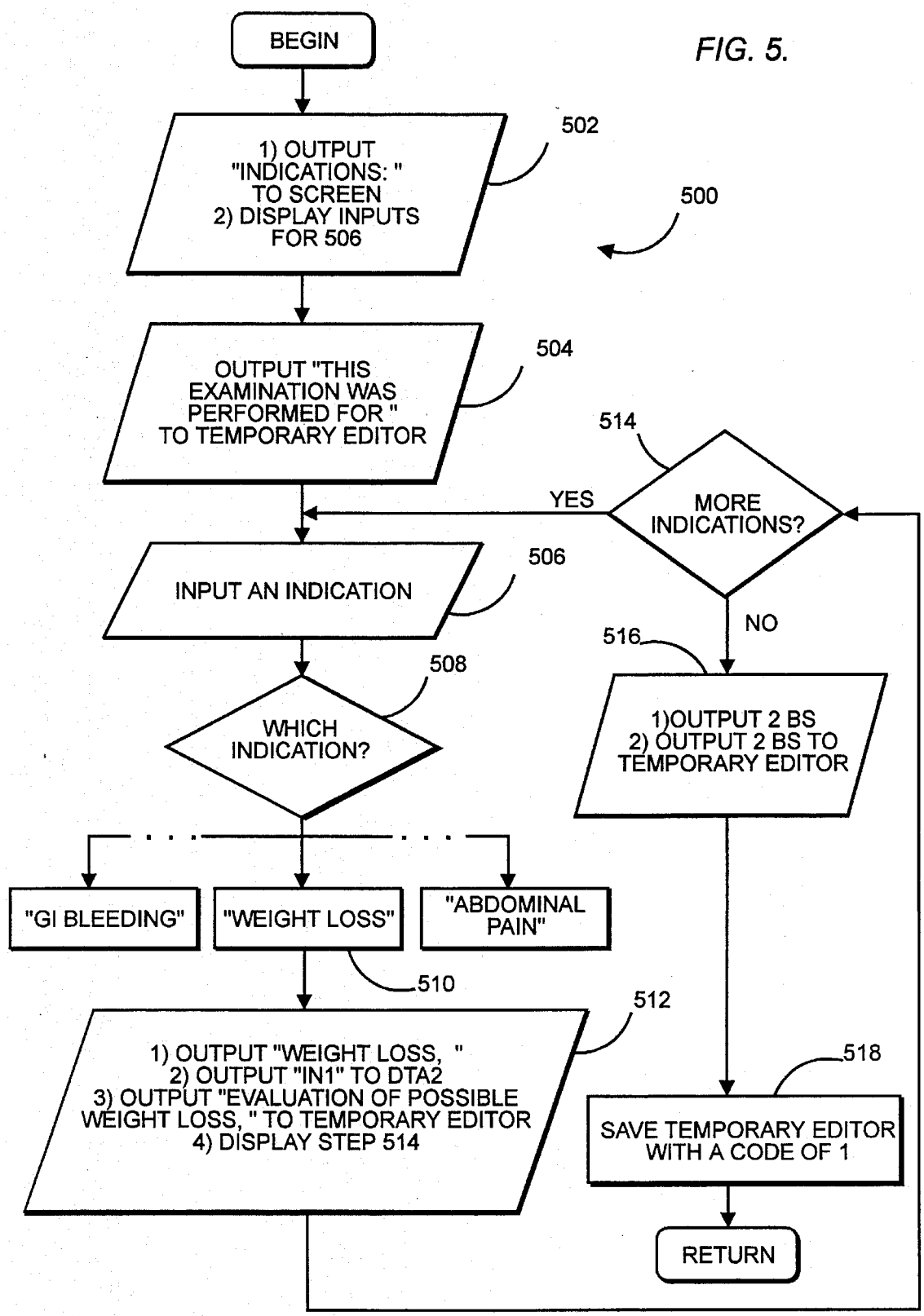
FIG. 5 is a computer program flowchart of the ENTER INDICATIONS module of the SCRIPT subroutine.

FIG. 5 illustrates ENTER INDICATIONS module 500 which, in general, presents a set of inputs on CRT screen 14 to the user. These inputs are medical indications which prompt the user to make a "decision" and enter which indication motivated the physician to perform the colonoscopy.

Figure 16:
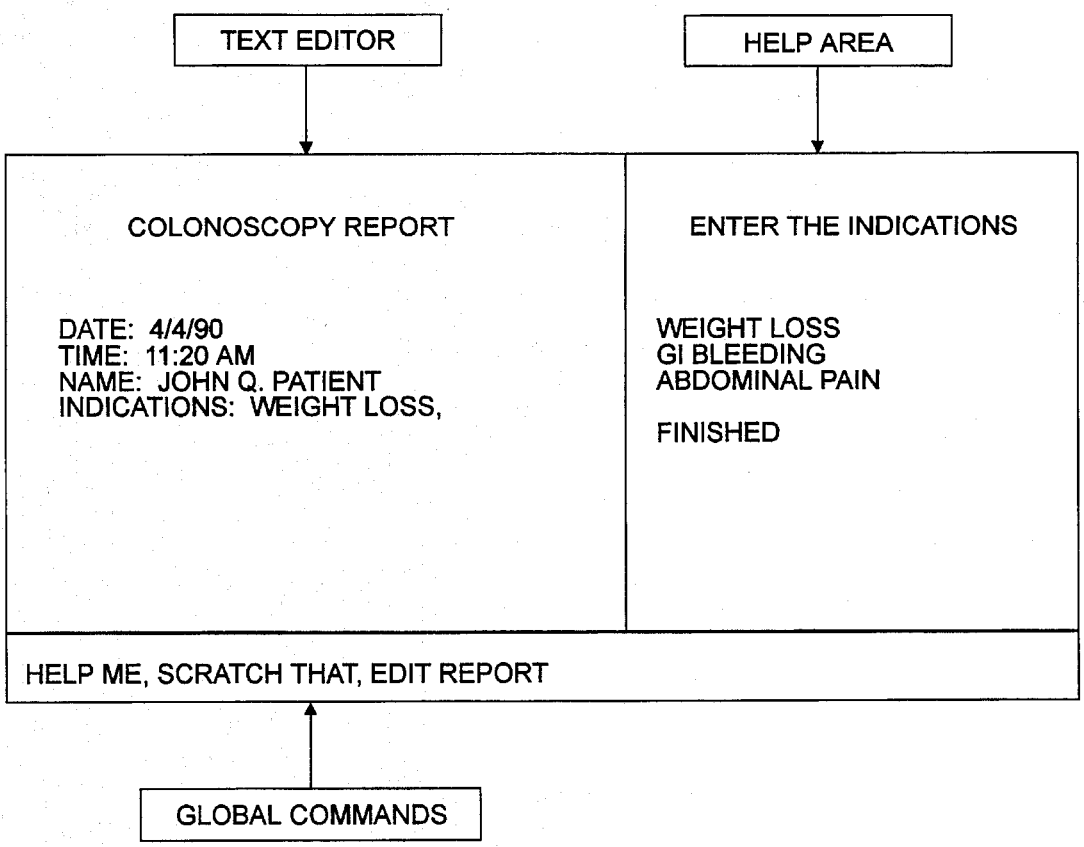
FIG. 16 is an illustration of a preferred CRT screen layout.

Module 500 enters at step 502 which displays the medical indication inputs on screen 14 in the screen layout illustrated in FIG. 16. An extended VGA mode allows the use of 132 columns on the screen layout in which the left portion presents an 80-column text section and in which the right portion presents a 52-column help area. The text section presents the text responses previously entered or retrieved in response to inputs. The help area displays the allowable or active inputs which the user can enter by speaking into microphone 16.

Only those displayed inputs are allowable which ensures that the user follows the predetermined script and thereby prevents inadvertent omission of important information. Furthermore, the presentation of the allowable inputs makes it unnecessary for the user to memorize any of the commands and inputs thereby presenting an extremely user-friendly system.

The screen layout also presents other so-called "global" commands which are generally always active and displayed. These allow particular functions such as those illustrated. The command "help me" retrieves an instruction screen which displays instructional information concerning the use of the system.

The "edit report" global command allows the user to edit the text displayed in left portion of the screen for customizing the report at certain circumstances.

After displaying the set of inputs in step 502, the program moves to step 504 which displays a portion of retrieved text corresponding to displayed inputs and also places this text in the text editor memory. Step 506 then prompts the user to make a decision concerning the displayed indications and enter the selected input by speaking into microphone 16.

Step 508 then asks which of the indications inputs was selected. In the present example, three possible indications of colonoscopy are indicated including "GI bleeding", "weight loss", and "abdominal pain." Depending upon which indication is selected, the script moves along the appropriate "branch." As explained further hereinbelow in connection with SCRIPT DESIGN routine 1700, each decision point in script can include any number of possible inputs as defined by the script designer in accordance with the needs of the particular user.

As shown in FIG. 5, the indication for weight loss was selected in step 510. The program then moves to step 512 in which the computer retrieves the action corresponding to the weight-loss entry. In this example, the corresponding actions include outputting "weight loss" to screen 14 and to the text editor to complete the text sentence, storing the code "IN1" in data transfer area 2 (DTA2), retrieving for subsequent presentation another set inputs, and displaying another input "more indications?" in step 514. The user is then prompted to respond and if the answer is yes, the program loops back to step 506.

The global command "scratch that" is very advantageous in the event of an input error. Entry of this command deletes the previous user input and all responsive actions to that input. For example, if the input "weight loss" was selected in error by the user, entry of the command "scratch that" causes the program to revert back to the status existing in step 506 before the error, and in so doing deletes the actions taken in step 512. Each time the user makes a decision by selecting and entering one of the displayed inputs, one of the actions associated with that input is a command "save state" in which the contents of all appropriate areas of memory are compressed and copied to central memory (RAM for rapid storage and retrieval). When the "scratch that" command is entered, all of the data stored in response to previous "save state" commands is retrieved and restored to the appropriate areas of memory which inherently deletes the matter associated with the erroneously entered input.

If no, the program moves to step 516 which outputs "2 BS" to the temporary text editor for two backspaces in order to present a correct sentence structure. Then, in step 518, saves the temporary editor information identified by code number "1."

Figure 6:
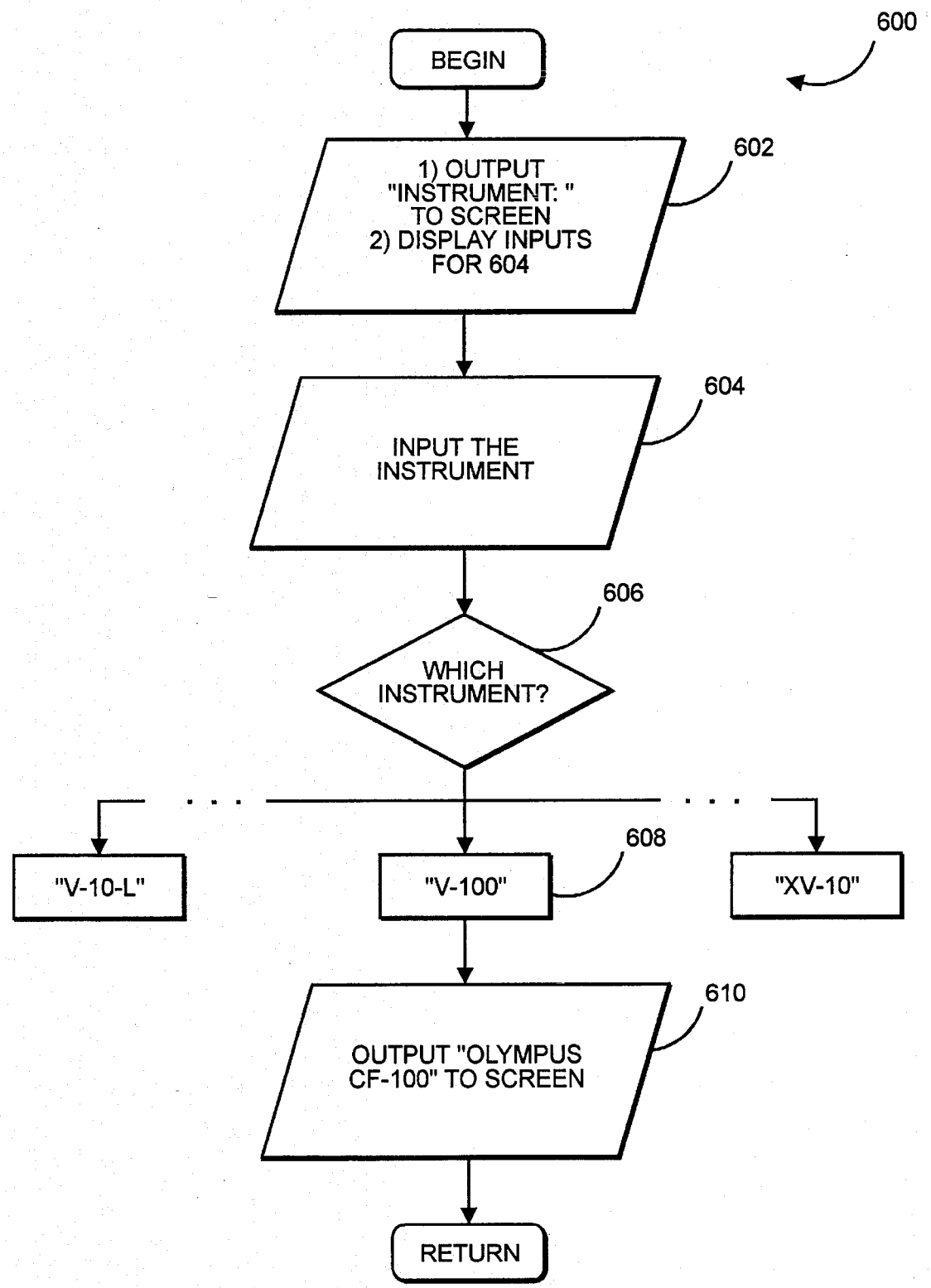
FIG. 6 is a computer program flowchart of the ENTER THE INSTRUMENT module of the SCRIPT subroutine.

The program then moves to ENTER THE INSTRUMENT module 600 illustrated in FIG. 6. Module 600 enters at 602 which displays the notation INSTRUMENT and a set of inputs as a list of instruments which the user might use to perform a colonoscopy in response to a weight loss indication. In step 604, the user is then prompted to enter the instrument used. Step 606 then asks which input was entered which, in this example, was the instrument "V-100" indicated in step 608.

In response, step 610 retrieves and performs the computer actions corresponding to selection of the "V-100" instrument which include displaying limitation "Olympus CF-100" which is the more formal name for the "V-100." This illustrates that the system of the present invention can be made very user-friendly by presenting inputs using jargon or notations familiar to and, in fact, selected by the user.

Figure 7:
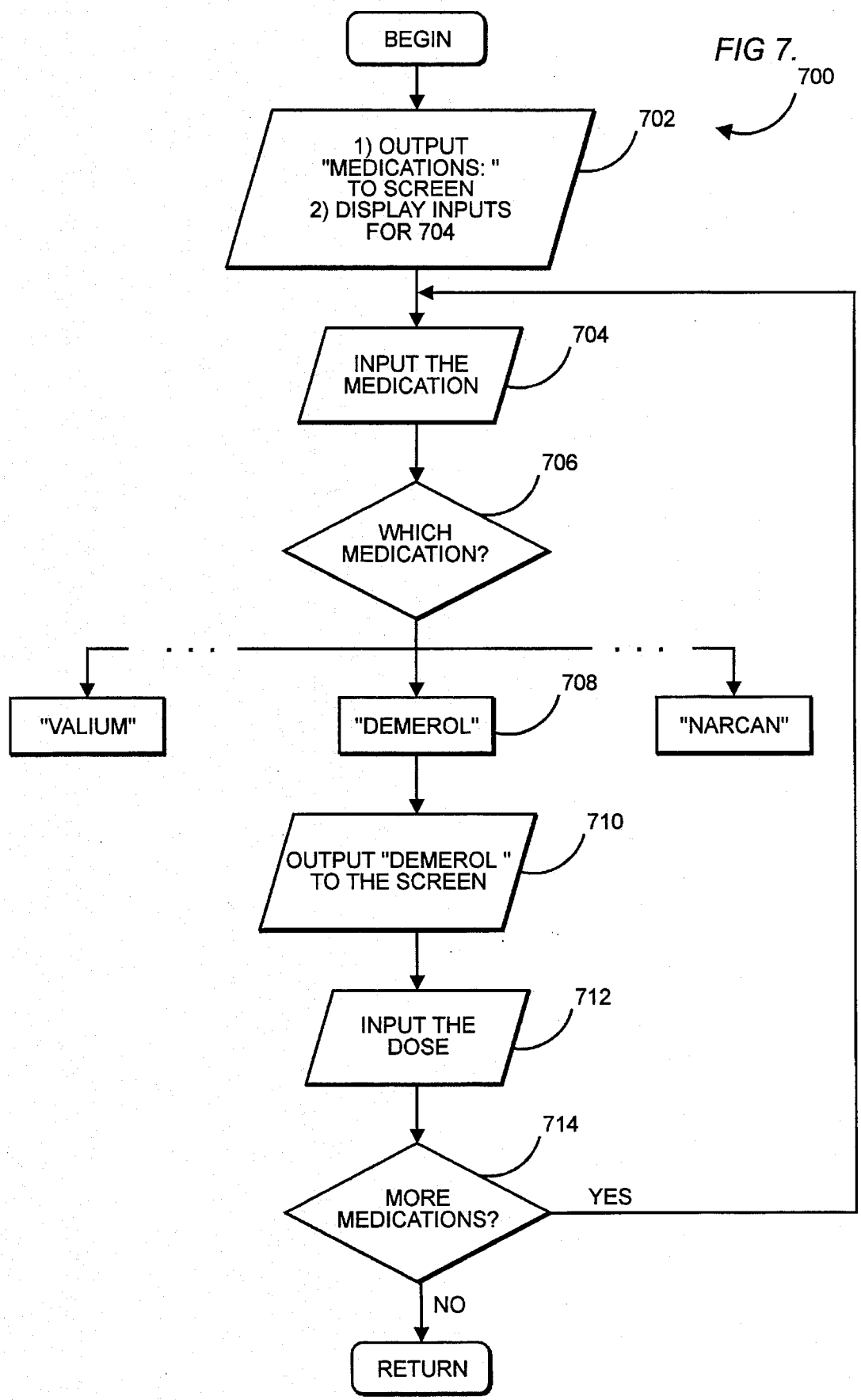
FIG. 7 is a computer program flowchart of the ENTER THE MEDICATIONS module of SCRIPT subroutine.

Step 610 also responds by retrieving and activating another set of inputs corresponding to the instrument selection which, in this example, is the ENTER THE MEDICATIONS module 700 illustrated in FIG. 7. This module enters at step 702 which presents the "medications" set of inputs on screen 14 as a set of possible medications which the physician might prescribe when using the instrument selected in module 600.

Step 704 then prompts the user to enter the medication used. In step 706 the program asks which input was selected. In this example, DEMEROL was entered as indicated as in step 708 and the program moves to step 710 to display "DEMEROL" on the left portion of the screen layout. Step 712 responds by retrieving a set of inputs corresponding to "procedures" and also prompts the user to enter the medication dosage. The program then moves to step 714 which asks whether other medications were also used. If yes, the program loops back to step 704.

Figure 8:
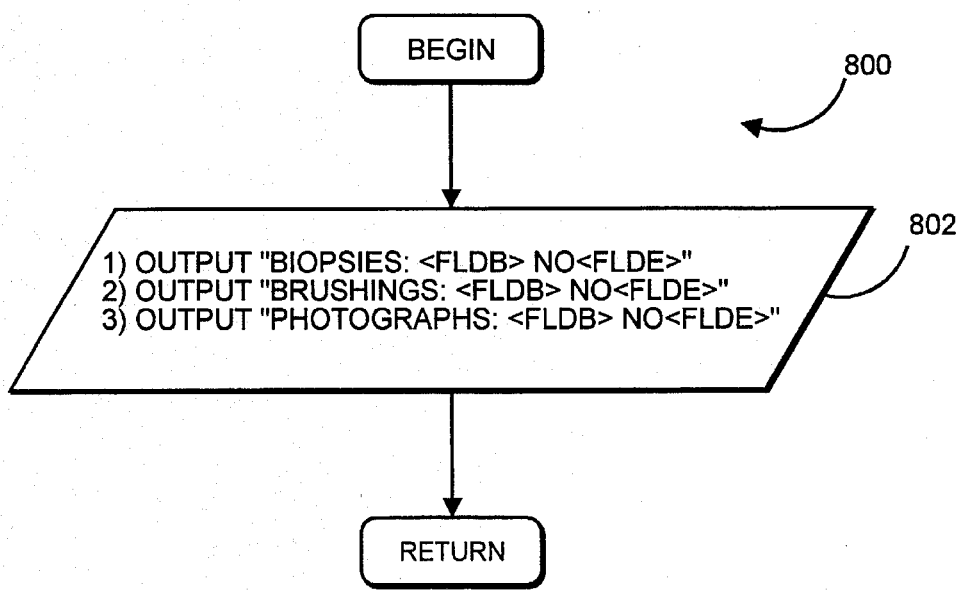
FIG. 8 is a computer program flowchart of the PROCEDURES DONE module of the SCRIPT subroutine.

If the answer in step 704 is no, the program moves to PROCEDURES DONE module 800 illustrated in FIG. 8. In this module, step 802 retrieves the list of procedures actually performed during the examination and displays these procedures on the left portion of the screen layout.

Figure 9A:
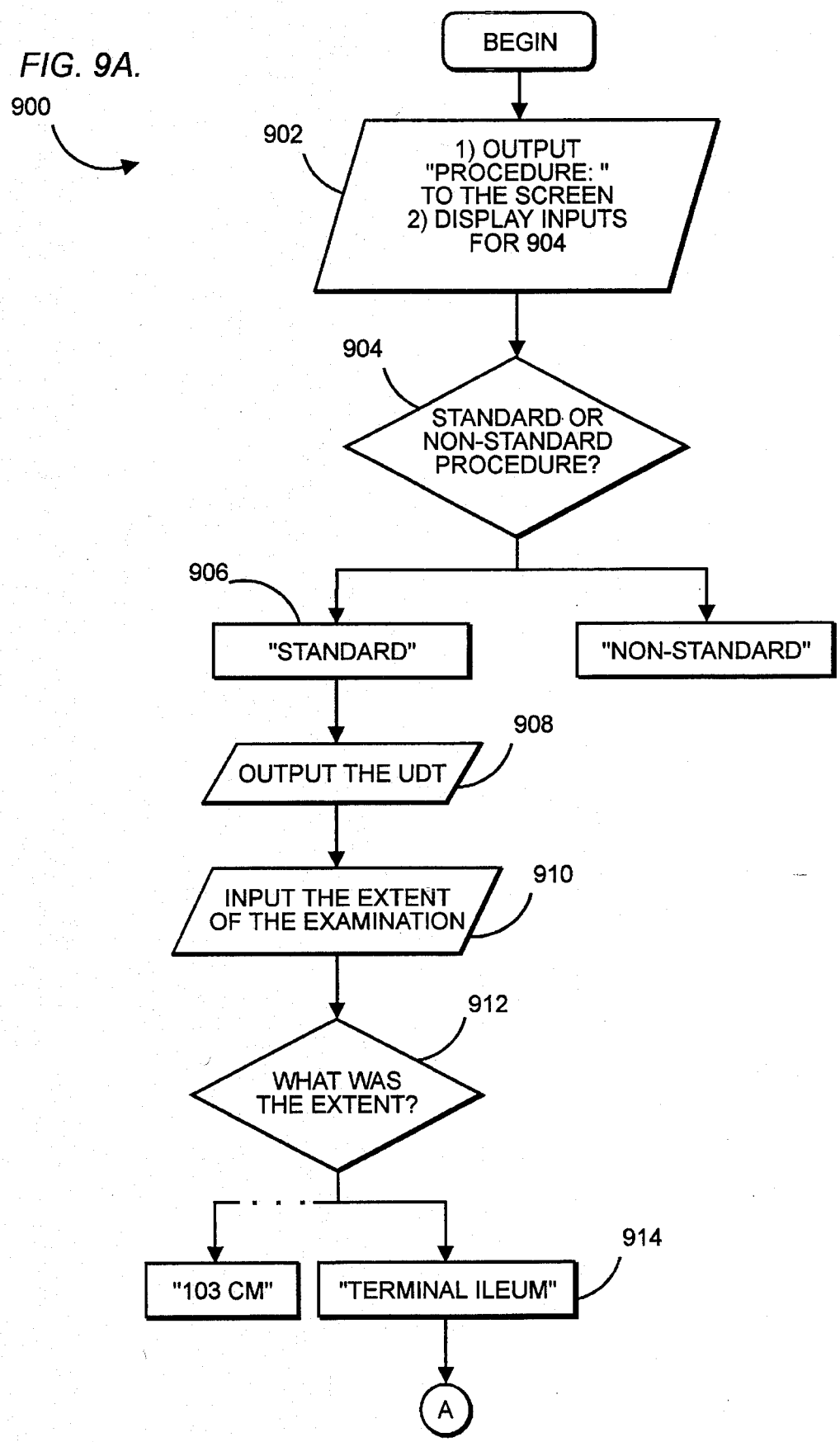
FIG. 9A is a portion of the computer program flowchart of the PROCEDURE NOTE module of the SCRIPT subroutine.
Figure 9B:
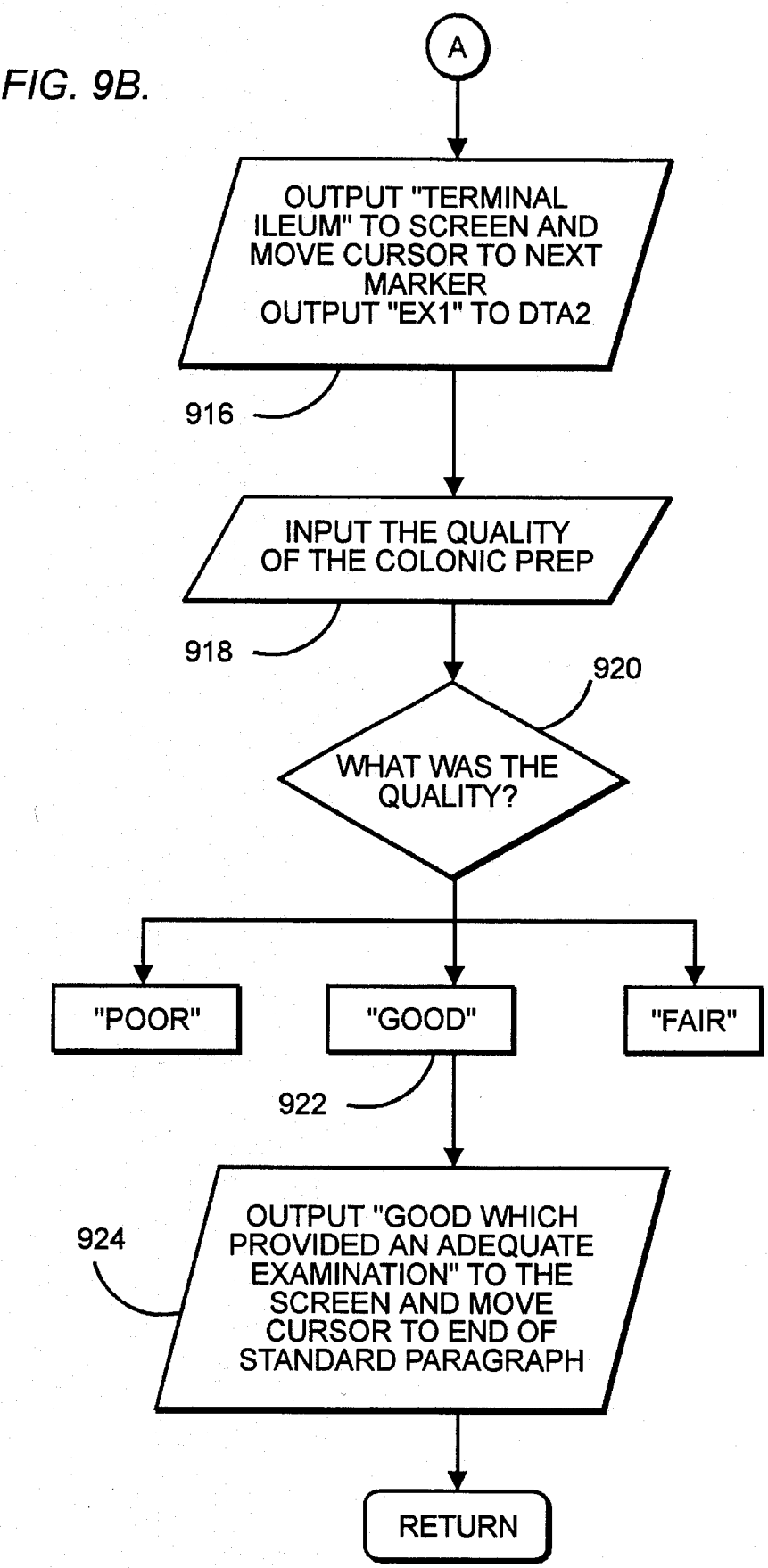
FIG. 9B is a computer program flowchart of the remaining portion of the PROCEDURE NOTE module.

After step 802, the program enters PROCEDURE MODE module 900 illustrated in FIG. 9A and 9B. This module documents patient consent, tells how the procedure was performed, describes any situations which may have limited the findings of the examination, and documents any complications.

Module 900 enters at step 902 (FIG. 9A) which presents the notation "procedure" to the user of screen 14 along with a set of inputs corresponding to whether the procedure was "non-standard" or "standard." In this example, the standard procedure was identified as entered in step 904 as indicated in step 906. In response, the program moves to step 908 to output the user-defined text (UDT) which is report material retrieved from the "patches" stored in the central memory, and to retrieve another set of inputs concerning the extent of the examination which the user in prompted to enter in step 910.

Step 912 asks the extent of the examination and, in this example, "terminal ileum" was selected as indicated in step 914. In response, step 916 (FIG. 9B) outputs "terminal ileum" to the screen, moves the cursor to the next marker, outputs the code designation "EX1" to data transfer area 2, and retrieves another set of inputs concerning the quality of the colonic preparation to which the user is prompted to respond in step. 918. It should be noted that the term "marker" is an example of an attribute byte of data associated with each displayable ASCII character in the text editor.

This is used by the script designer for executing desired commands such as cursor placement.

In step 920, the program asks the quality of the preparation which, in this example, was selected as "good" as shown in step 922. In response, step 924 retrieves and displays the corresponding text entry on the left portion of the screen and saves this text in the temporary editor. Step 924 also moves the cursor to the end of the standard (see step 906) paragraph and retrieves a set of inputs corresponding to examination "findings."

Figure 10A:
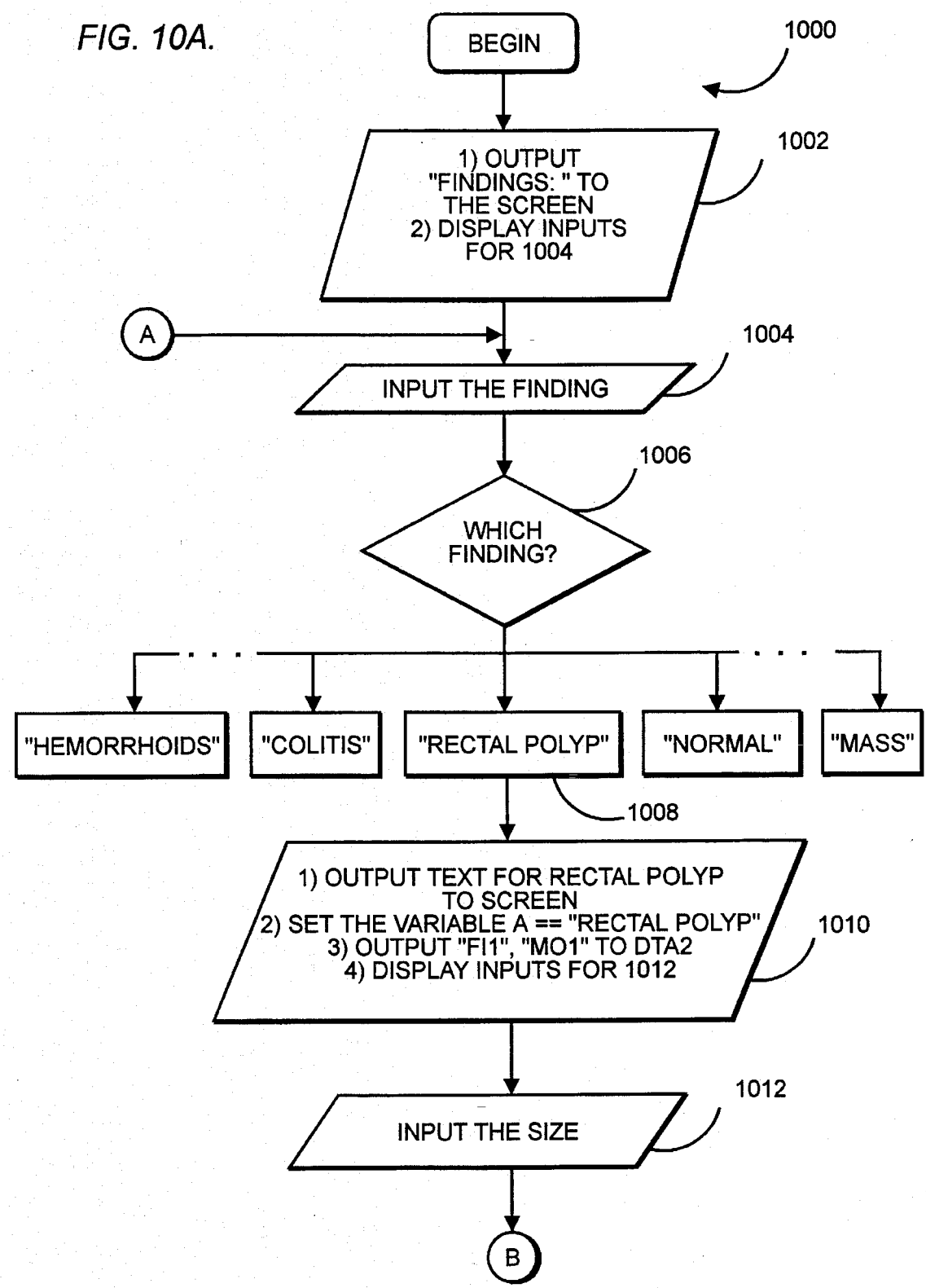
FIG. 10A is a portion of a computer program flowchart of the FINDINGS module of the SCRIPT subroutine.
Figure 10B:
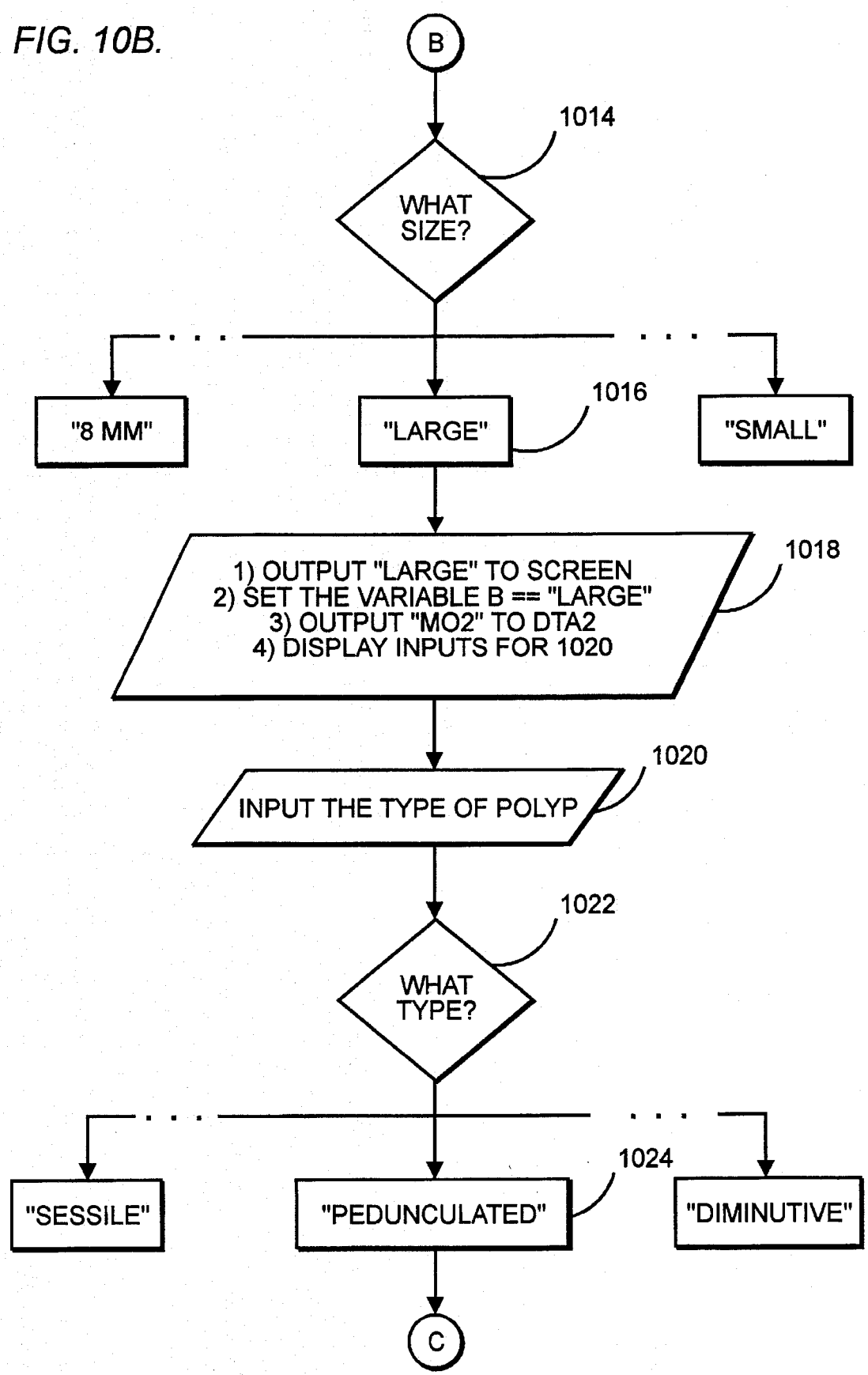
FIG. 10B is a computer program flowchart of another portion of the FINDINGS module.

In response to step 924, the program enters FINDINGS module 1000 (FIGS. 10A, B, C and D). Step 1002 presents the set of inputs corresponding to examination findings to the user on screen 14 and then, in step 1004, prompts the user to select one of the finding inputs. In step 1006 asks which finding was entered which was "rectal polyp" as indicated in step 1008 for this example.

In response, the computer performs the actions indicated in step 1010 which include outputting the appropriate text to the screen, setting the software variable "A" equal to "rectal polyp", outputs the codes "FI1" and "MO1" to DTA2, and retrieves for display another set of inputs corresponding to polyp size.

In step 1012 (FIG. 10B) the user is prompted to enter the polyp size and step 1014 asks what size was entered by the user which, in this example, is "large" as indicated in step 1016. In response to the decision by the user to enter the "large" input, the program, in step 1018, outputs the corresponding text to screen 14, sets software variable "B" equal to "large", outputs code "MO2" to DTA2, and retrieves and displays a set of inputs corresponding to polyp type.

Figure 10C:
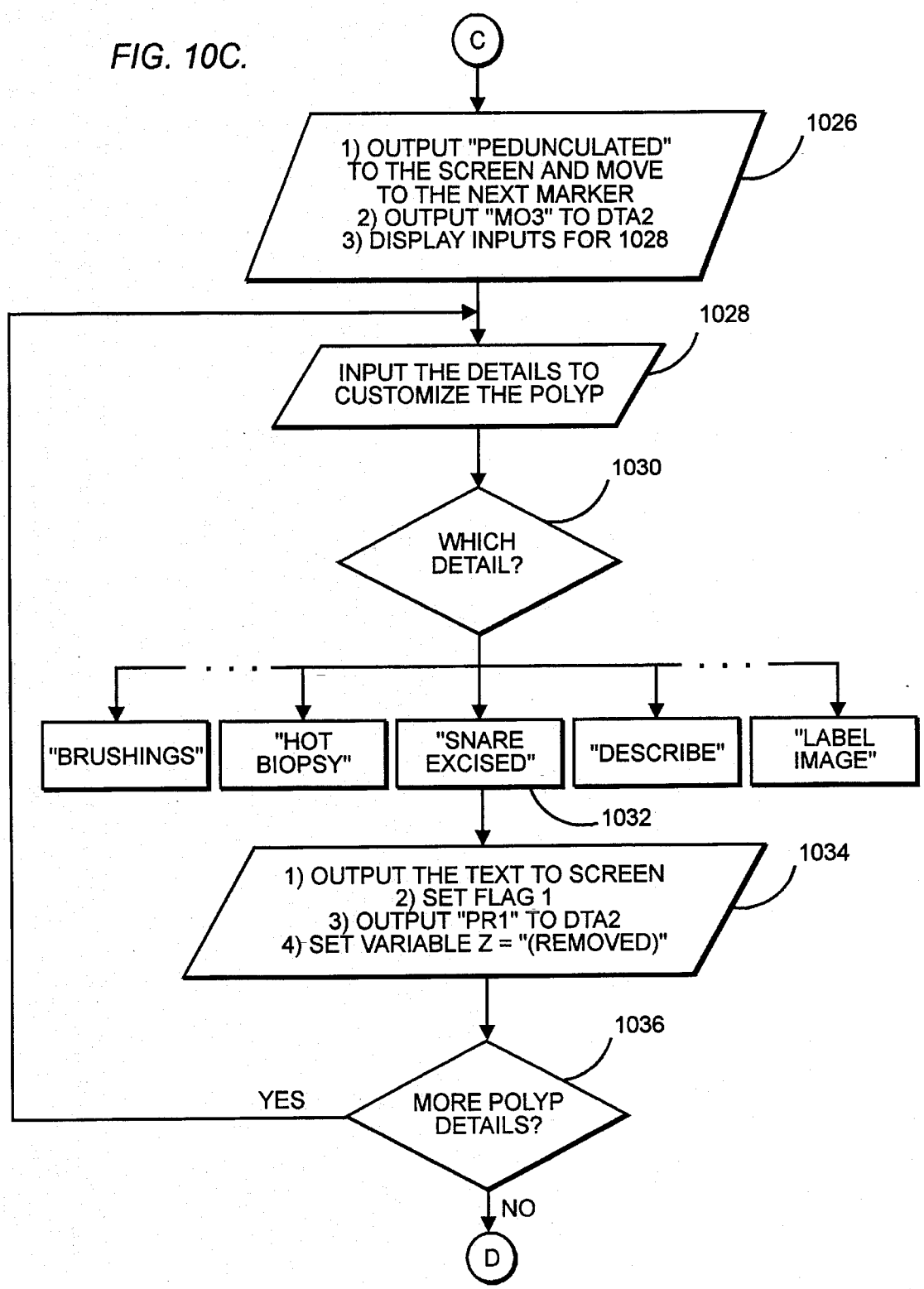
FIG. 10C is a computer program flowchart of another portion of the FINDINGS module.

Step 1020 prompts the user to enter polyp type which is identified in step 1022 as "pedunculated" in step 1024. In response, the computer retrieves and performs the actions shown in step 1026 (FIG. 10C). These actions include retrieving and outputting the corresponding report material, outputting the code "MO3" to DTA2 and retrieves another set of inputs concerning polyp detail.

Step 1028 prompts the user to enter one of the polyp detail inputs decided in step 1030 and shown as "snare excised" in step 1032. In response, the computer retrieves and performs the corresponding actions as shown in step 1034.

The program then moves to step 1036 which asks whether the user wishes to enter more polyp details. If yes, the program loops back to step 1028.

For example, further details might include an image of the finding which image was developed during the procedure using an instrument including such capability. A designated image is digitized, stored on the hard drive, and given a one word label, for example, for identifying the image so that it can be conveniently retrieved, if desired., in order to include it in the report being generated. Those skilled in the art will appreciate that this capability substantially enhances report effectiveness and allows reliable documentation of findings, for example.

Figure 10D:
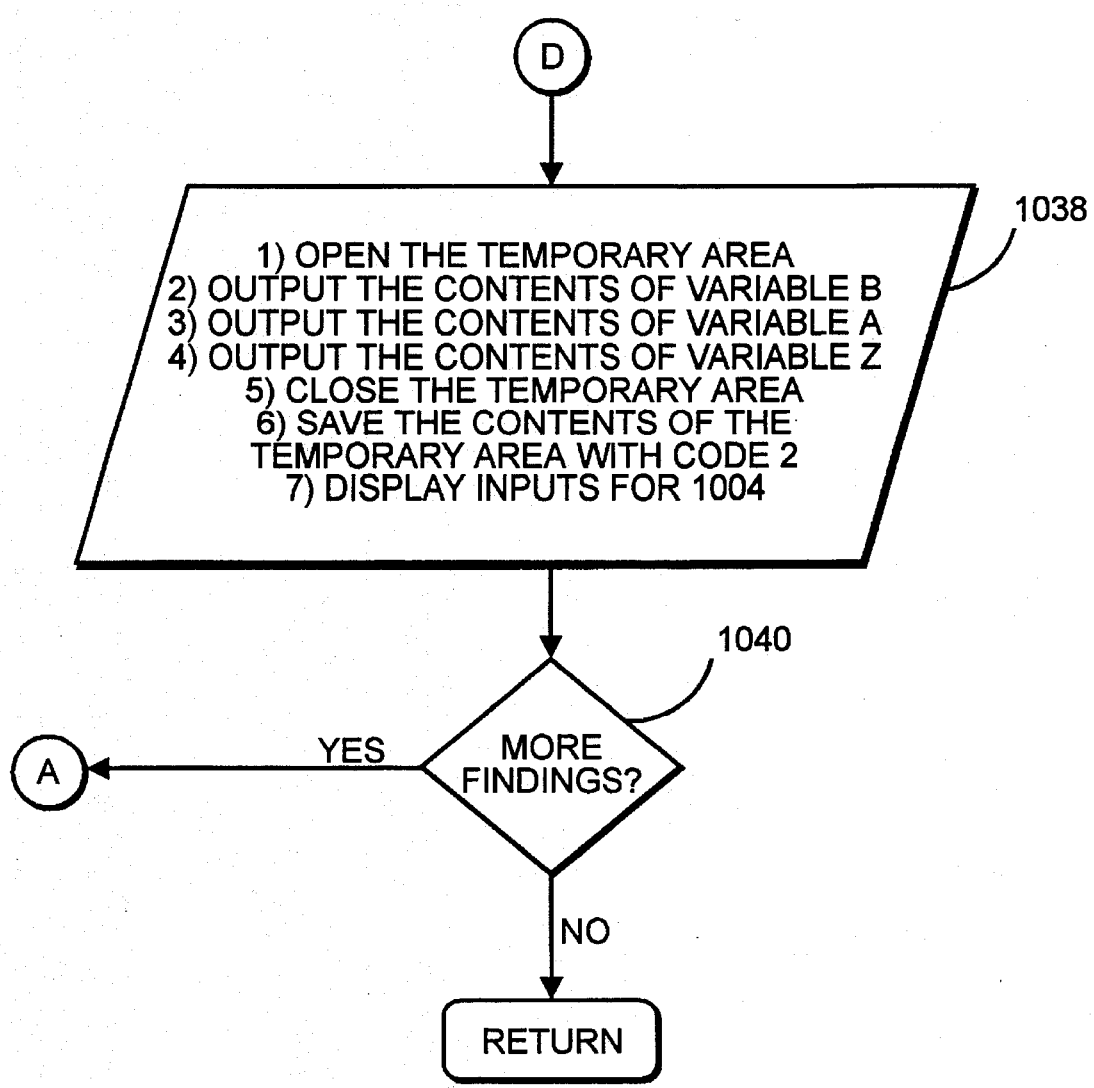
FIG. 10D is a computer program flowchart of the remaining portion of the FINDINGS module.

If no, the program moves to step 1038 (FIG. 10D). This steps performs the actions shown including opening a temporary area in the text editor, outputs the contents identified by variables B, A and C, closes the temporary area and saves the contents thereof identified by code "2."

Step 1040 then asks whether the user wishes to enter additional findings. If yes, the program loops back to step 1004 (FIG. 10A). If no, the program moves to the next set of inputs retrieved in step 1034 in correspondence to the selected polyp detail input.

Figure 11:
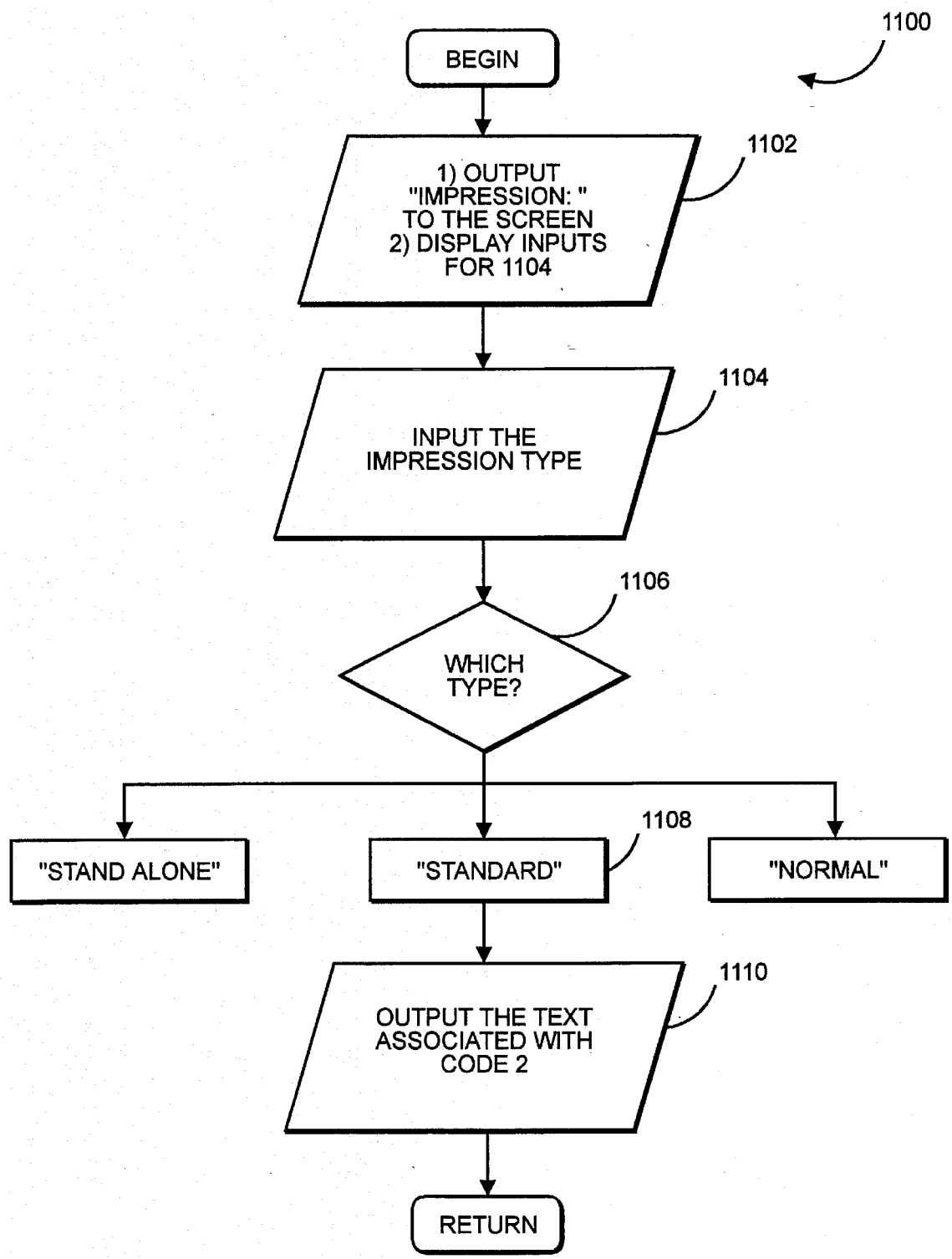
FIG. 11 is a computer program flowchart of the IMPRESSION module of the SCRIPT subroutine.

FIG. 11 illustrates IMPRESSION module 1100 which enters at step 1102 to display a set of inputs concerning the physicians "impression" of the polyp which the user is prompted to enter in step 1104. Step 1106 asks which impression type was entered by the user identified in step 1108 as "standard" for this example. In response, step 1110 retrieves and outputs the corresponding report material associated with code 2 (as indicated in step 1038) to the screen and text editor, and retrieves the next set of inputs corresponding to "recommendations" for subsequent display in step 1202 (FIG. 12).

Figure 12:
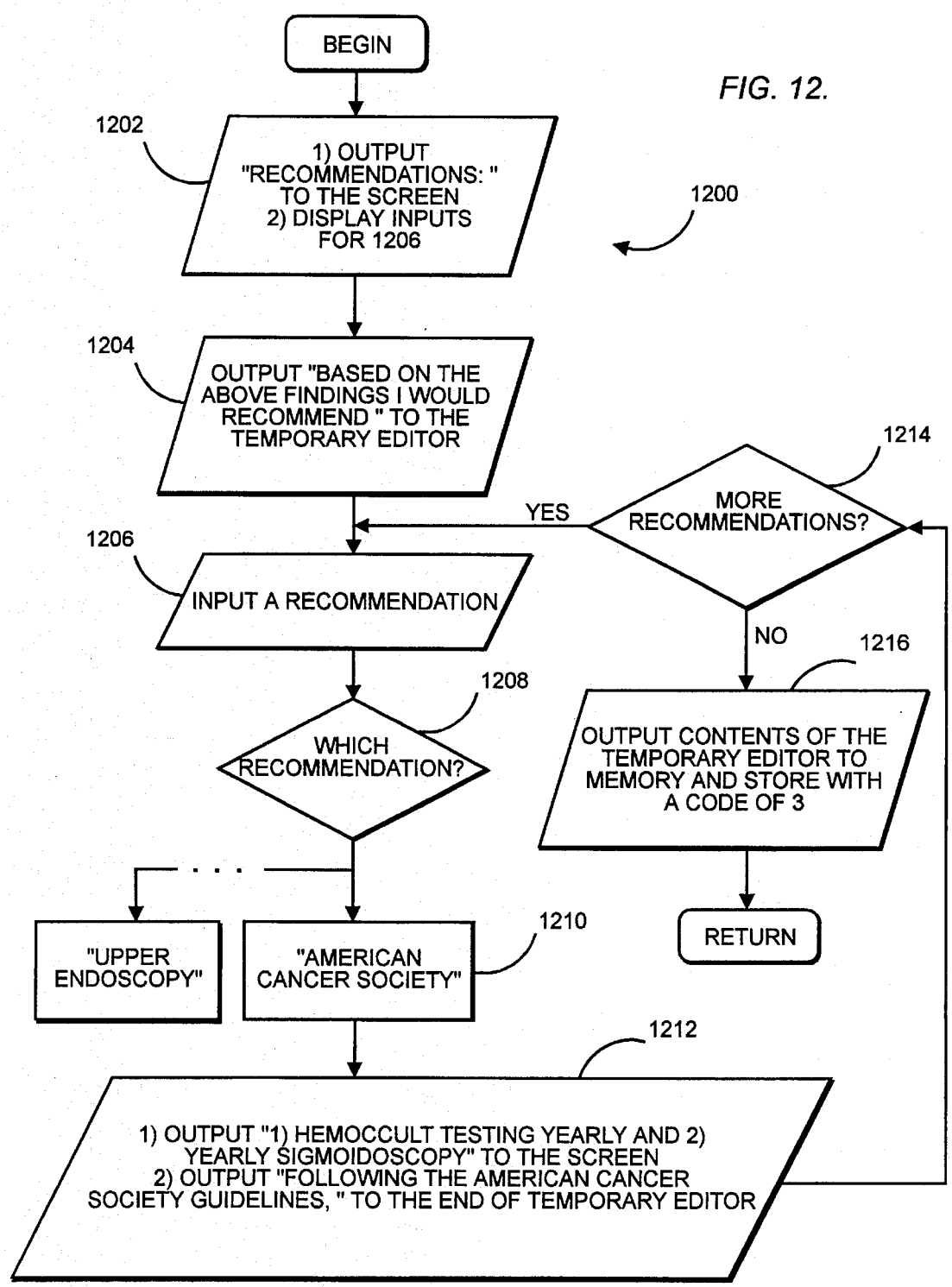
FIG. 12 is a computer program flowchart of the RECOMMENDATIONS module of the SCRIPT subroutine.
Figure 13:
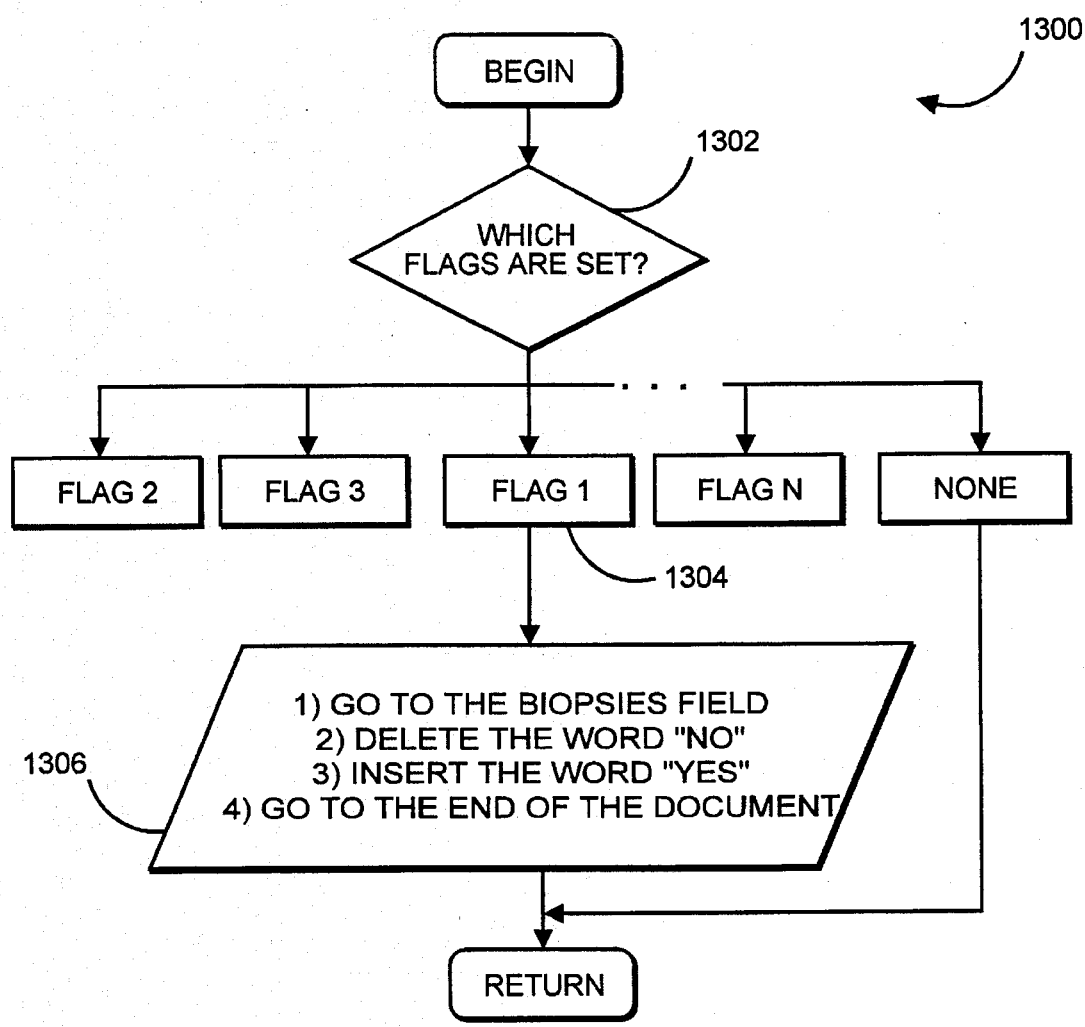
FIG. 13 is a computer program flowchart of the EDIT PROCEDURES module of the SCRIPT subroutine.

FIG. 12 illustrates RECOMMENDATIONS module 1200 which is entered in response to step 1110. This module enters at step 1202 which displays a set of inputs of recommendations corresponding to the previous inputs. The program then moves to step 1204 which retrieves and displays the first part of a text and then prompts the user, in step 1206, to enter the selected recommendation. Step 1208 asks which recommendation was entered as indicated in step 1210 for this example as "American Cancer Society" standard recommendations. These include the recommendations shown in step 1212 retrieved in response to the input selection, and retrieval of another set of inputs for subsequent display concerning editing procedures.

The program then moves to step to 1214 which asks whether the user wishes to make further recommendations. If yes, the program loops back to step 1206. If no, the program moves to step 1216 to output the contents of the temporary editor to memory identified as code number "3."

Figure 15:
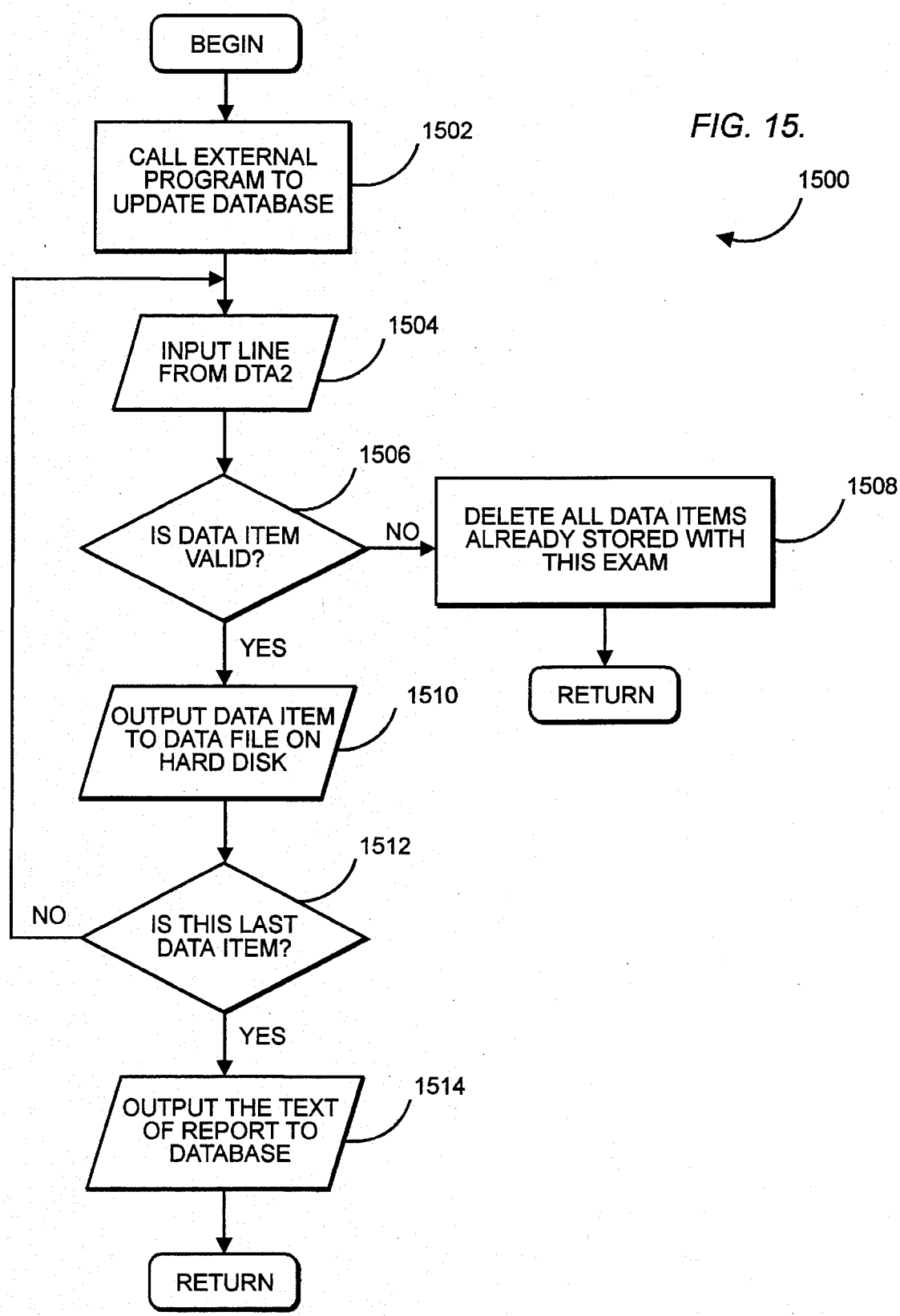
FIG. 15 is a computer program flowchart of the UPDATE DATABASE module of the SCRIPT subroutine.

After completion of step 1216 the program enters EDIT PROCEDURES module 1300 illustrated in FIG. 15 which begins at step 1302 and asks which software flags have been set. In this example, because flag 1 was set as indicated in step 1304 the program moves to step 1306 to perform the actions shown in order to indicate that a biopsy was performed.

Figure 14:
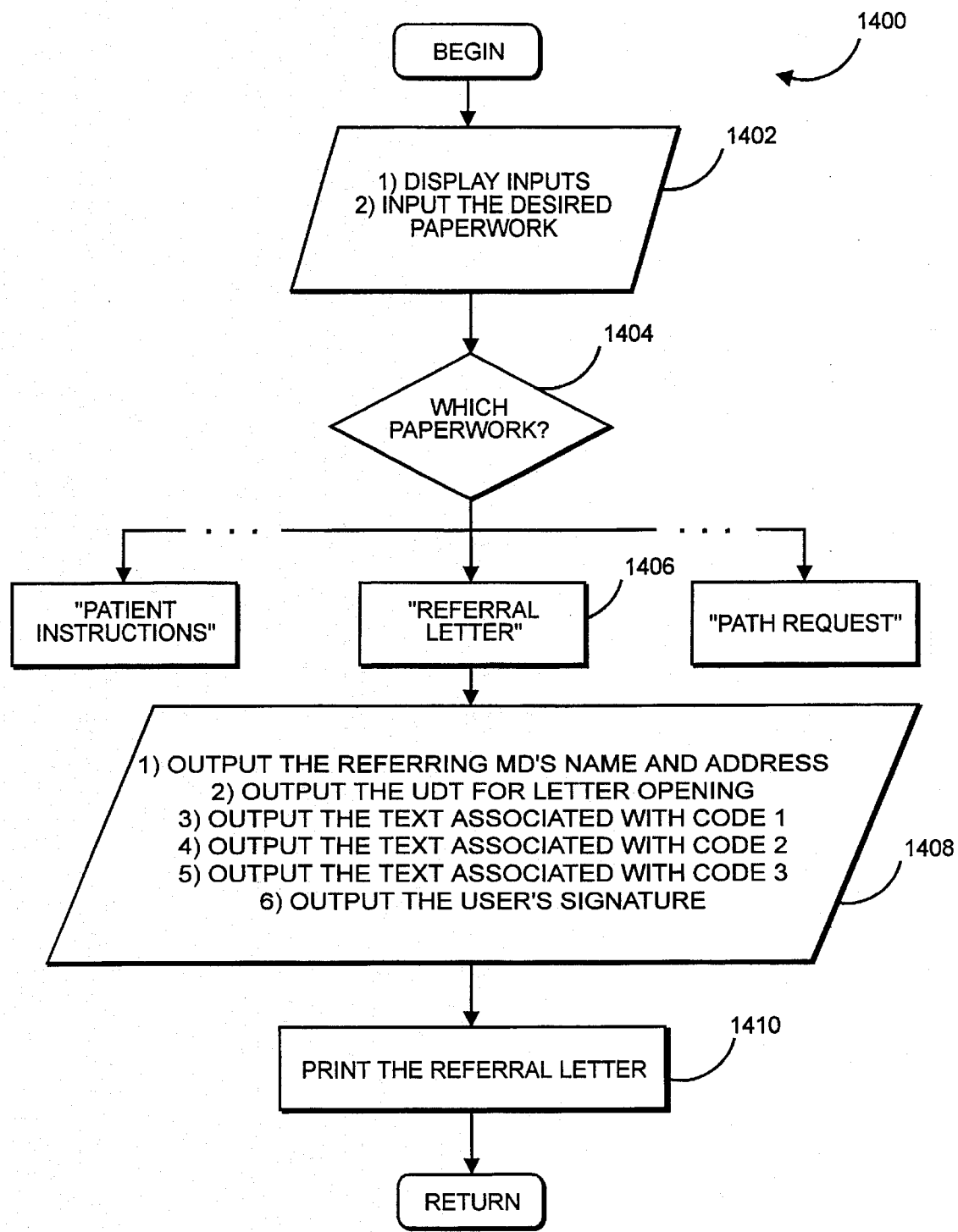
FIG. 14 is a computer program flowchart of the OTHER PAPERWORK module of the SCRIPT subroutine.

After completion of the modules described above the program enters OTHER PAPERWORK module 1400 illustrated in FIG. 14. Step 1402 presents a set of inputs on screen 14 which prompts the user to enter the type of paperwork desired, that is, what type of a report is to be generated. Step 1404 asks which input was entered and, in this example, "referral letter" is indicated in step 1406 as the type of report in the form of a letter to the referring physician.

In response to the input, step 1408 responds by performing the corresponding actions as shown. In this step, all of the report material retrieved in response to entry of the various user inputs is compiled to form a report. In particular, specific report material was stored and identified by code number. Step 1408 retrieves the report material according to code number compiles material in order to print the referral letter in step 1410 by way of laser printer 20.

The program next enters UPDATE DATABASE module 1500, FIG. 15 which retrieves the various database codes defined during the report generation process and places these codes in the database for use in preparing summary reports. Module 1500 enters a step 1502 which calls the external program for updating the database. As those skilled in the art will appreciate, many such database programs are available such as DBASE 3 or PFS FILE which can be selected as a matter of user choice depending upon the particular application. In the present invention, however, the so-called "data entry bottle neck" often encountered with data entry programs is avoided because the data codes are stored as the report is generated rather than waiting until the end of the process. In this way, when the report generation is done, the data generation is also done.

The program then moves to step 1504 which retrieves the various codes stored in DTA2 and then asks if step 1506 whether each retrieved data item is valid. If no, step 1508 deletes these data items and the program returns to step 22 (FIG. 2).

If the answer in step 1506 is yes, step 1510 outputs the data items to the data base to be stored on hard disk of computer 12. In step 1512 the program then asks whether the data items stored in 1510 is the last one, and if no, loops back to step 1504 to retrieve the next data item from DTA2. Steps 1504-12 are performed until all of the data items have been handled. Finally, in step 1514 the report itself is stored on the hard drive.

As discussed above, the report is generated by compiling the various report materials retrieved in response to entry of various inputs by the user. In the medical arts, for example, some medical instruments also store images of the patient condition observed by the instrument. For example, the colonoscopy instrument may be equipped to generate images which can be stored in the form of retrievable report material. In such circumstances, this image report material can be included along with the textual report material. In such circumstances, the report material retrieved in response to a given input could include both textual and image material for subsequent output by way of laser printer 20. In this way, a much more comprehensive report can be provided in which images of the condition are documented in the report itself.

In the discussion above also highlights a further advantage of the present invention which allows database accumulation of the appropriate data pertaining to many reports. With this information available, the user can compile summary reports indicating, for the example used, the number of colonoscopy examinations completed in the last year, the percentage of polyps detected for a given indication, and so forth.

Figure 17:
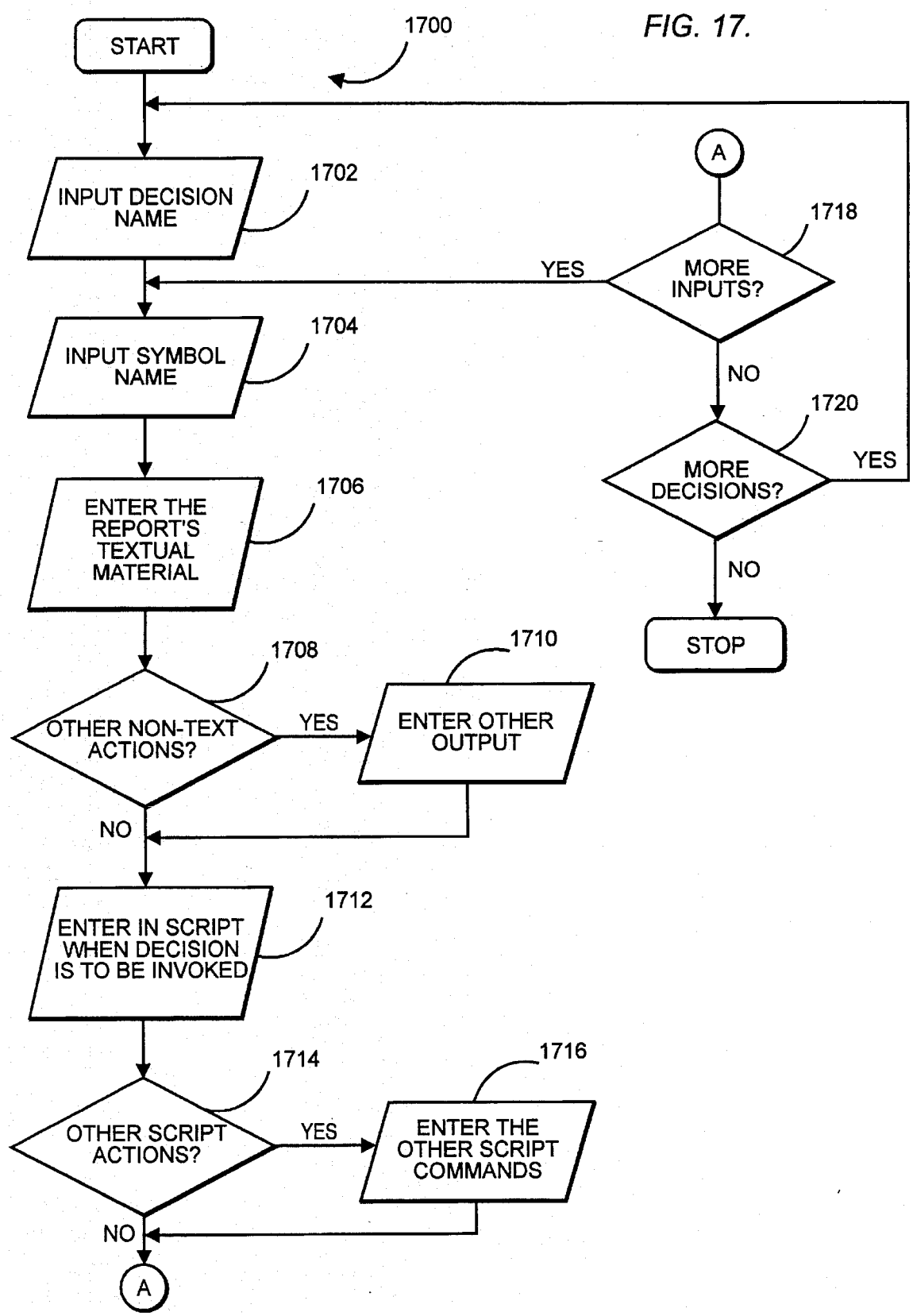
FIG. 17 is a computer program flowchart of the SCRIPT DESIGN of routine.

The detailed discussion above regarding FIGS. 3–16 illustrates a preferred embodiment for generating medical reports and in particular a colonoscopy report. The invention, however, is not so limited in that scripts can be designed for many different professions and types of reports. FIG. 17 illustrates SCRIPT DESIGN routine 1700 which allows a design of custom script. As will be appreciated from the discussion above, the basic building block of the script is the so-called "decision" in which a user is presented with a set of inputs and in which the computer responds to the user entry of a selected input by performing predefined actions corresponding thereto.

By way of overview, the script designer in cooperation with the user, determines the information needed for generating a report and then determines the possible user inputs for each item of information with a "decision" responding to each item of information. With each input, it is then decided what actions must be taken and those actions defined. At this point the specific report material is also created and placed in memory. Part of the defined actions may also include the definition of other sets of inputs which may be entered because of the previous input.

Turning now to the flowchart of FIG. 17, SCRIPT DESIGN module 1700 enters at step 1702 which prompts the designer to enter the name of a particular set of inputs or "decision", for example, "indications" (FIG. 5), "instrument" (FIG. 6), "medications" (FIG. 7), and so forth. The program then moves to step 1704 which prompts the script designer to enter the names of the various inputs included in the decision set defined in step 1702. As illustrated above in FIG. 5, the inputs corresponding to the decision "indications", includes "GI bleeding", "weight loss" and "abdominal pain."

In step 1706 the script designer next enters the report material, if any, to be retrieved in correspondence with each user input. This allows the designer to enter report material for a particular user which may have been specifically provided by the user. In this way, the report material can be created to fit the user's style of writing, if desired.

In step 1708 the script designer asks whether the user wishes to perform other non-textual actions such as a database code, for example (see step 916, FIG. 9B). If yes, the user enters these other actions in step 1710.

If the answer in step 1708 is no, or after step 1710, the script designer moves to step 1712 to enter data indicating when in the script the decision defined in step 1704 is to be invoked.

Step 1714 then asks whether actions other than report material are to be taken in response to each input. If yes, the script designer moves to step 1716 to enter the other actions. Such actions might include retrieval of other sets of inputs such as "medications" retrieved in step 610 (FIG. 6) in the description above. These actions may include other computer commands such as "print the referral letter" of step 1410 (FIG. 14). As those skilled in the art will appreciate the flexibility of SCRIPT DESIGN 1700 allows the script designer to enter as many other computer commands as may be desired or required.

If the answer in step 1714 is no, or after step 1716, the script designer moves to step 1718 and decides whether any other inputs are to be provided for the decision, that is, input set defined in step 1704. If yes, the script designer loops back to step 1704 and names the next input. The script designer continues to move steps 1706–1718 until all of the inputs included in the input set defined in step 1704 have been defined.

The script designer then moves to step 1720 and decides whether to define other decisions. If yes, the script designer loops back to step 1702 and enters the name of the next decision. As discussed in connection with step 1712, a designer enters the information concerning each decision as to where in the script the decision is to be invoked. For example, a particular decision may be invoked in response to the entry of a particular entry from some other decision as described above in connection with FIGS. 3–17. After the designer has entered all of the decisions, inputs, and corresponding actions, the answer in step 1720 is no, and the design process ends.

By the use of a so-called script in the report generating system hereof, the script designer can design a script customized for a particular profession or specialty which may be usable by all of those in that profession or specialty. The flexibility of the present system, however, allows each script to be further customized for an individual use if desired. This can be accomplished quickly and easily by merely modifying the existing script to include, for example, that report material which fits an individual user's writing style or standards of practice.

Another embodiment of the present invention is shown in FIG. 18 which illustrates a preferred computer system 1800 for generating a report which includes a headset speaker 1802 and a headset microphone 1804 connected to an RF transceiver 1806, RF base station 1810 (with an antenna not shown), input keyboard 1808, computer 1812, image screen 1814, CRT screen 1816 and printer 1818. Computer 1812 preferably includes a 25 MHz 80386 CPU, 2 megabytes of memory, a hard disk drive, a CD-ROM disk drive and a floppy disk drive. Computer 1812 also includes a CompuSpeak Laboratories speech board, a Prose 4000 Speech Synthesis Board, a MATROX Illuminator-16 image capture board and a VGA card for driving screen 1816.

FIGS. 19A–27B are computer program flowcharts illustrating the preferred program for operating computer system 1800 and the preferred method of the present invention for generating a report using speech interaction. As used herein, report includes a cost estimate, bill, statement, invoice or other type of structured compilation where known information is retrieved or manipulated to form a report. The example which will be used to illustrate the operation of system 1800 involves creating an estimate of the cost to repair a damaged automobile. The data used in calculating the estimate is taken from the Mitchell-Matix Estimate database. This database is obtained by the computer using the CD-ROM disk drive.

In general, the user is able to use system 1800 in a "handsfree" mode by utilizing the RF headset speaker 1802 and microphone 1804 and this also allows the user a great degree of mobility. The user preferably carries a Mitchell Collision Estimating Guide corresponding to the type and year of car to be estimated and custom designed for use with the present invention. This estimating guide contains all the parts of the car separated into categories.

The user wears headset speaker 1802 and microphone 1804 which are connected to a portable RF transceiver which in turn is connected via an RF link to base station 1810. Base station 1810 is then connected to computer 1812 which transmits and receives data via the speech synthesis and speech recognition boards. The RF transmission preferably operates in full duplex mode thereby allowing the user to interrupt the speech synthesis of system 1800 with an available command. This improves the speed at which data can be entered once the user is familiar with the flow of the system. Also, system 1800 is preferably equipped with a cellular telephone thereby allowing the user to call suppliers or others for needed information on the spot.

Each time a phrase is recognized by the speech recognition board the speech synthesis board generates a response which is communicated via the RF link and headset speaker 1802 to the user to confirm what phrase was recognized. This confirmation is particularly important if the user is at a remote location away from CRT screen 1816 because it informs the user what data system 1800 is processing. Other types of guidance available to the user include allowing the user to request previously entered data from system 1800. For example, if the user speaks the phrase "where am I" system 1800 responds with a phrase identifying the item currently being entered while the utterance "play back" causes system 1800 to repeat the previously entered items or sets of items. Also, system 1800 responds to "what can I say" by stating the utterances currently allowable, and repeats the last generated phrase in response to the user saying "please repeat".

FIGS. 19A and 19B illustrate the start up of the application. The program starts at step 1902 and loads the application defaults which are data representative of the applicable tax and labor rates. Next, the user name is entered at step 1904 which identifies the user and causes the vocabulary for the identified user to be loaded into memory at step 1906. Step 1908 then determines if all the words necessary for the estimate have been trained for the identified user. If no, at step 1910, all untrained words are trained and saved as the identified user's vocabulary in step 1912.

After step 1912 or if the answer to step 1908 was yes, the program moves to step 1914. Next, at step 1914, the main menu is displayed on CRT screen 1816, if available, and the speech synthesizer utters the command "waiting at main menu." This command informs the user that the estimate is ready to be started and then at step 1916 the computer recognizes the speech input commands for the main menu. The user then replies with an input command at step 1918 (FIG. 19B) and step 1920 determines which command was uttered. There are three possible commands to be recognized, the command "adjust speech output", "create estimate" or "change estimate."

If the input command at step 1918 was recognized at step 1920 as "create estimate," the program moves to step 1924, otherwise the program moves to step 1922 or 1926 if one of the other commands is recognized. Step 1924 causes the creation of a new estimate at step 1928, the details of which are explained below. Next, step 1930 closes all files and the program is stopped.

An overview of the creation of an estimate is shown in FIG. 20. The program enters at step 2002 in which the user enters the claim number either one digit at a time or by choosing from a list of previously entered claims which are spoken by the speech synthesizer and displayed on screen 1816. Next, a service code which identifies the make and model of the subject automobile, is entered into the computer at step 2004 and then, at step 2006, the model year of the subject auto is entered into the computer. An image of an automobile corresponding to the damaged automobile is retrieved and displayed at step 2008 if the imaging screen 1814 is available. The part prices and labor amounts are then retrieved at step 2010 from the CD-ROM for the identified automobile and this data is loaded into memory. The program then moves to step 2012 where the required estimate data is input into the computer by the user. The estimate is then calculated at step 2014 and printed at step 2016.

FIGS. 21–27B are the computer program flowcharts for entering the estimate data and calculating the estimate of steps 2012 and 2014. The reports which are to be generated are divided into sections called global commands. In the preferred embodiment, five global commands are used which include "administrative data," "vehicle options," "repair data," "rate overrides" and "explanations." The speech interface is constructed such that the user has the ability to enter data into any of these sections at nearly any point during program operation. This is advantageous because the user can jump to a new section without first exiting the current section such as typically required with prior art menu driven systems.

Referring to FIG. 21, a user-uttered input report global command is received at step 2102. Next, the program determines, at step 2104, which global command was uttered by the user. The program then proceeds to one of the corresponding steps 2106–2118.

If "administrative data" is recognized, the program moves to step 2202 as shown in FIG. 22A. Step 2202 deactivates the phrase "administrative data" so that system 1800 will not respond to this entry again because the user is presently in this global. At step 2204, the speech synthesizer of system 1800 then responds to the user with the command "enter administrative data."

The appropriate terms needed for entering administrative data into system 1800 as well as all the other global commands are then activated at step 2206. The user then enters an active term at step 2208, and step 2210 determines by way of speech recognition what the user has uttered. If another global command was uttered, the program loops back to step 2104.

If the phrase "point of impact" was recognized, the program moves to step 2214. Similarly, if "condition" or "loss type" were recognized, the program moves to step 2216 or 2218, respectively. Assuming "point of impact" was recognized system 1800 responds, at step 2220 to the user with the phrase "enter the point of impact." System 1800 then activates the points of impact that are possible for an automobile and the term "finished."

The insurance industry has developed twelve points of impact for a car, each of which is represented by a number thus, the numbers 1 through 12 are activated for recognition. A user uttered digit is then entered at step 2224 and step 2226 determines if "finished" was spoken by the user. If no, the program moves to step 2228 where the system responds with the number spoken by the user, and then loops back to step 2222. By repeating the number that was spoken, system 1800 provides feedback so that the user knows what is being entered. This process continues until system 1800 recognizes the utterance "finished" at step 2226. The program then loops back to step 2204 for receipt of another a global command or more administrative data.

After the administrative data is complete, another global command is entered which might be "vehicle options" of step 2108. The program then proceeds to step 2302 (FIG. 23A) which deactivates the phrase "vehicle options." Step 2304 then responds with the phrase "enter vehicle option." Next, step 2306 activates the vehicle option and global commands to be recognized, and the user utters an active command at step 2308.

The program then moves to step 2310 which determines which active command was entered. If a global command was recognized, the program proceeds to step 2312 and then loops back to step 2104. Preferably word groups and industry jargon are used as the active commands to enhance the ease of use. For example, the phrase "body type style" is common in the auto insurance industry and the program proceeds to step 2314 when this phrase is recognized. Steps 2316 and 2318 recognize the phrases "air conditioning" and "engine type," respectively.

Assuming "air conditioning" was recognized at step 2316, the program moves to step 2320 which determines if "air conditioning" has been previously entered. If no, the program loops back to step 2304 to receive the next vehicle option. If yes, step 2322 generates the phrase: "Air conditioning has been entered. Do you wish to delete it?" The user response of yes or no is then received in step 2324 and step 2326 then determines which answer was uttered. If no, as identified in step 2330, the program loops back to step 2304. If the answer is yes as determined in step 2328, the program moves to step 2332 which deletes the air conditioning command whereupon the program loops back to step 2304.

The program operation as represented by steps 2320–2332 presents a significant advantage of the present invention in that it prevents duplication of repair entries. This is a significant advance over the prior art systems which have no such provision and which allow duplicate entries to be made resulting in duplicate payments. The cumulative effect of these duplicate payments has a significant financial impact on the insurance industry, and elimination of these payments highlights a substantial advantage of the present invention.

The global command "repair data" may be spoken next which causes the program to move to step 2110 and then to step 2402 (shown in FIG. 24A) at which the phrase "repair data" is deactivated. After the particular type of car has been chosen, the selection of the parts that have to be repaired or replaced is accomplished by identifying a section, call out and item for each part. These items are organized in the estimating guide mentioned above which the user carries.

System 1800 then speaks "enter section, body component" at step 2404 and then step 2406 activates the repair data commands and the other global commands. Next, an uttered input is received from the user at step 2408 and step 2410 determines which command was uttered. As explained above, if a global command is recognized at step 2410, the program moves to step 2412 and then loops back to step 2104 to proceed to that class of information which was recognized. If the term "one" is recognized at step 2410, the program proceeds to step 2414. Each of the sections, callouts and items of the chosen automobile contained in the estimating guide are represented by a number and here the number "one" represents the front bumper. Other possible commands to be recognized at step 2410 include "body component" and "additional cost" which causes the program to move to step 2416 or 2418, respectively.

Assuming that the program is at step 2414, step 2420 is next which causes the front bumper graphic to be displayed on imaging screen 1814, if available. Next, step 2422 causes system 1800 to respond with the statements "front bumper", "enter callout number." Step 2424 then activates the numeric phrases which are possible for the front bumper callout. The user then enters the desired numeric phrase at step 2426 and step 2428 determines which number was uttered.

Steps 2430 through 2436 represent possible numbers to be recognized. If "one" is again recognized, step 2438 causes system 1800 to respond with the phrases "one", "enter item number" and step 2440 recognizes the numeric phrases for the item numbers that are possible. The user then enters the appropriate numeric phrase at step 2442 and step 2444 determines which number was uttered with steps 2446 through 2452 representing possible phrases. If "one" is recognized, step 2454 responds "front cover, 2 door hatchback" and, if CRT screen 1816 is available, the part and labor costs are displayed at step 2456. In any event, these costs are retrieved into memory and added to the estimate.

Next, step 2458 causes system 1800 to respond "enter next item or modifier" and step 2460 activates the appropriate commands to be recognized. The user then utters a command at step 2462 and step 2464 determines which command was recognized. If this command was a global command the program moves to step 2466 and loops back to step 2104. If "callout"or "section" was recognized, the program moves to step 2468 or 2470 respectively, where the program loops back to step 2404 if "callout" was uttered, and to step 2422 if "section" was the term recognized.

Step 2472 is an example of a method of editing a previous entry. When "repair" is recognized at step 2472 system 1800 prompts the user to input cost data for the part in question and system 1800 then substitutes this data for the stored cost data.

If, at step 2464, the command "rate override" is recognized, the program loops back to step 2104, proceeds to step 2112, and then to step 2502 where the command "rate override" is deactivated. Next, step 2504 causes system 1800 to respond "which rate to override?" and step 2506 activates the rate override commands and the available global commands. The user then utters the appropriate active command at step 2508 and step 2510 determines which command was spoken. The program moves to step 2512 if a global command is recognized or to step 2514 if the term "body" is recognized. Steps 2516 and 2518 recognize the phrases "finish" and "part discount", respectively.

Assuming "body" was recognized at step 2514, the program proceeds to step 2520 where system 1800 responds with, for example, "the old rate was $12.34" and then with the command "enter the new rate" at step 2522. Next, step 2524 activates the term "finished" and activates the digits and numeric phrases which are to be recognized. The user utters a digit at step 2526. Step 2530 then determines if "finished" was spoken. If no, system 1800 responds with the digit that was spoken by the user in step 2526, and the program loops back to step 2526 to receive another command from the user. If "finished" was spoken, the program loops back to step 2504 to receive another command such as those in steps 2512, 2516 or 2518.

When the term "explanations" is uttered the program moves to step 2104 and proceeds to step 2114. The program then moves to step 2602 at which point the command "explanations" is deactivated. The "explanations" section contains a set of standard statements that may be put in the report. Step 2604 then responds with "enter the explanation code" and step 2606 activates the explanation and global commands. The user then utters a command at step 2608.

Next, step 2610 determines which command was recognized and if "code 1" was recognized at step 2614 the program proceeds to step 2620 which responds with "code 1, all estimates are final." This response tells the user that system 1800 has recognized the "code 1" command and the appropriate statement will be added to the report. Steps 2616 and 2618 represent other available statements and if one of these codes is chosen, the program proceeds similarly to the operations following step 2614.

When the user asks system 1800 to "calculate estimate" the program proceeds to step 2116 and then to step 2702 (as shown in FIG. 27A) at which the estimate data is read from the file and transferred to a database calculator, preferably the Mitchell Matix database. Step 2704 then calculates the estimate and, at step 2706, system 1800 responds with "estimate calculation complete."

Step 2708 then asks "which item to repeat." Next, step 2710 activates the estimate calculation commands and the user enters the needed item of the estimate at step 2712. Step 2714 then determines which item was requested. If "total cost" is recognized, the program proceeds to step 2718 and then to step 2724 where system 1800 responds, for example, with "the total cost is $1234.56." Other possible items the user may request include "total labor" at step 2720 and "sales tax" at step 2722.

As those skilled in the art will appreciate, the above described program is but one example of an embodiment of the speech interactive system in accordance with the present invention. The program could be altered to accommodate the generation of other types of structured reports such as inventory analysis or damage estimates for homes. Also, for example, the link with the microphone and speaker could be hard wired instead of the preferred RF connection or the speech generated by the computer could be recorded rather than synthesized.

Having thus described in the preferred embodiment of the present invention the following is claimed as new and desired to be secured by Letters Patent:

1. A user-interactive method of operating a computer for generating a report, the computer having memory means for storing data, input means for receiving inputs into the computer, and output means for presenting outputs from the computer, said method comprising the steps of:

storing data in the computer memory means representative of sets of user inputs representing information needed for generating said report, and data representative of computer actions respectively corresponding to said inputs, said actions including at least one of retrieving report material, presenting a set of user inputs, and implementing computer commands;

presenting by way of the computer output means one of said sets of user inputs for selection by user;

entering by way of the computer input means a user-selected input;

responding in the computer to said user-selected input by performing said actions corresponding thereto;

repeating said entering and responding steps in accordance with said corresponding actions until said inputs needed for generating said report have been entered; and compiling in the computer said report material corresponding to said user-selected inputs for generating said report thereby.

2. A user-interactive method of operating a computer for generating a report, the computer having memory means for storing data, input means for receiving inputs into the computer, and output means for presenting outputs from the computer, said method comprising the steps of:

storing data in the computer memory means representative of sets of user inputs representing information needed for generating said report, and data representative of computer actions respectively corresponding to said inputs, said actions including at least one of retrieving report material, presenting a set of user inputs, and implementing computer commands;

presenting by way of the computer output means one of said sets of user inputs for selection by user;

entering by way of the computer input means a user-selected input;

responding in the computer to said user-selected input by performing said actions corresponding thereto:

repeating said entering and responding steps in accordance with said corresponding actions until said inputs needed for generating said report have been entered; and compiling in the computer said report material corresponding to said user-selected inputs for generating said report thereby, said method further including the step of providing said output means as a voice synthesizer.

3. The method as set forth in claim 2, further including the step of providing said voice synthesizer with a remote connection between the user and the computer via an RF communication means.

4. A report generating method comprising the steps of:

storing, in a computer, data representative of sets of user-spoken inputs with said inputs representative of information needed for generating said report, and data representative of computer actions corresponding to said inputs, said actions including at least one of retrieving report material, presenting a set of user inputs, and implementing computer commands;

presenting by way of voice synthesis means one of said sets of user inputs for selection by user;

receiving by way of voice responsive means a user-spoken input;

responding in the computer to said user-spoken input by performing said actions corresponding thereto;

allowing the entry of a user-spoken input only once;

providing by way of said voice synthesis means directional information as to which elements of the report have been completed and which remain to be completed;

repeating said entering and responding steps in accordance with said corresponding actions until said inputs needed for generating said report have been entered; and compiling in the computer said report material corresponding to said user-spoken inputs for generating said report thereby.

5. An apparatus for generating a report comprising: a computer;

means operably coupled with said computer for storing data representative of sets of user inputs representing information needed for generating said report, and data representative of actions of said computer corresponding to said inputs, said actions including at least one of retrieving report material, presenting a set of user inputs, and implementing computer commands;

output means operably coupled with said computer for presenting outputs therefrom including sets of user inputs for selection by a user of said apparatus; and input means operably coupled with said computer for receiving inputs into the computer including one of said user-selected inputs, said computer including— means for responding to said user-selected inputs by performing said actions corresponding thereto, and means for compiling said report material corresponding to said user-selected inputs for generating said report thereby.

6. The apparatus as set forth in claim 5 wherein said speech synthesis means further includes a speaker means.

7. The apparatus as set forth in claim 6 wherein said speaker means is connected to the apparatus via an RF link.

* * * * *